March 9, 1965  H. J. ALBRIGHT ETAL  3,172,519
CIGARETTE VENDING MECHANISM
Filed Jan. 18, 1963  11 Sheets-Sheet 3
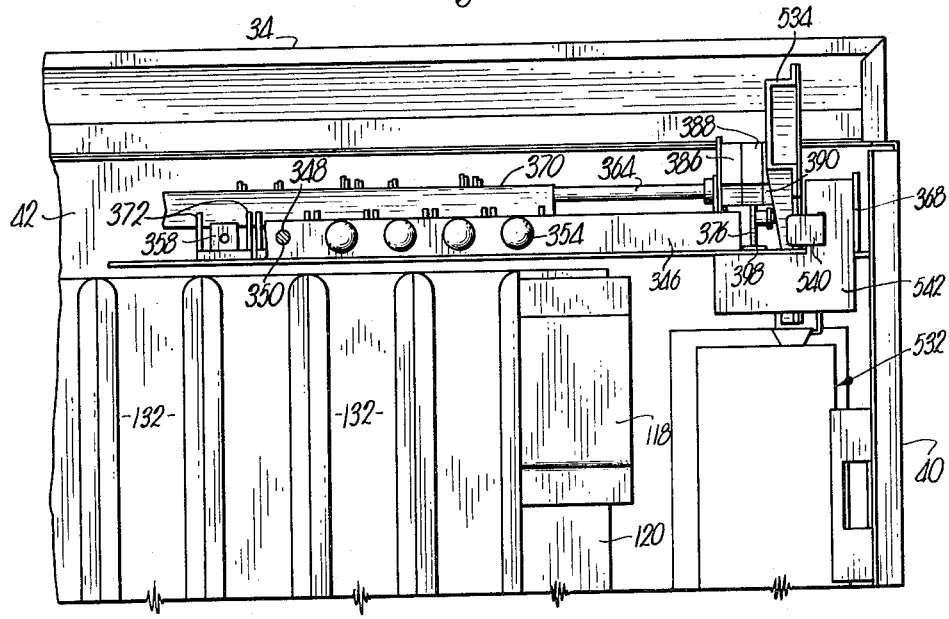
Fig.3A.
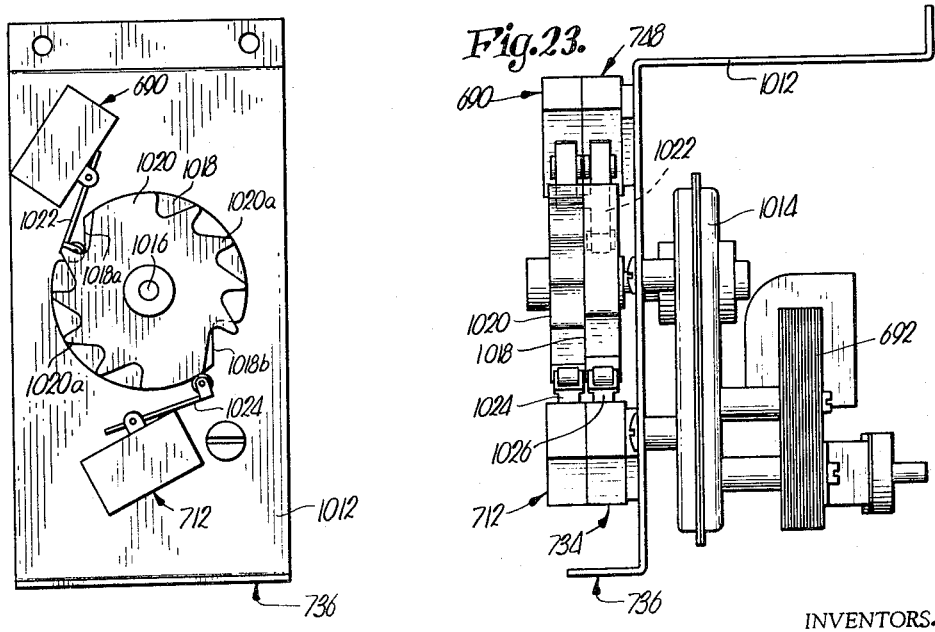
Fig.23.
Fig.22.
INVENTORS.
Henry J. Albright
Eugene R. Sabin
BY Elmer Bradey Offutt
Hovey, Schmidt, Johnson & Hovey
ATTORNEYS.

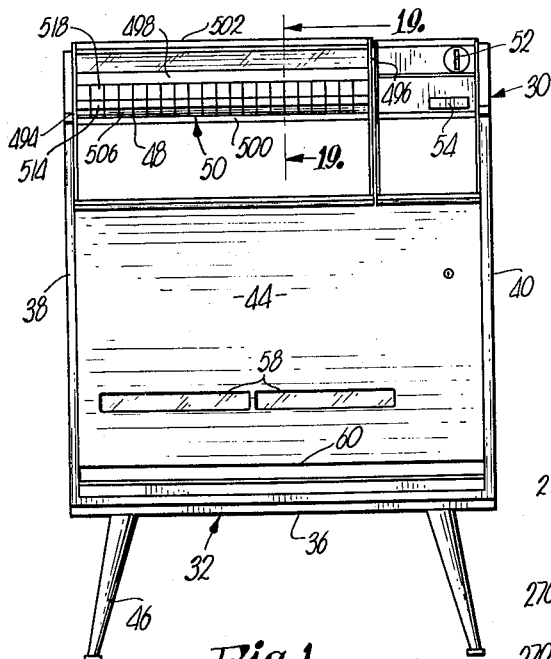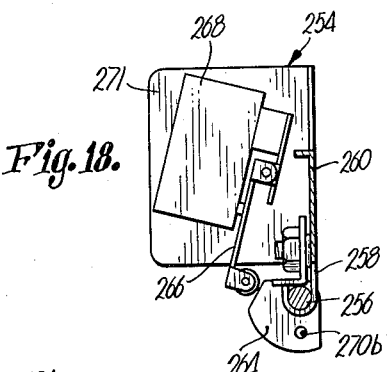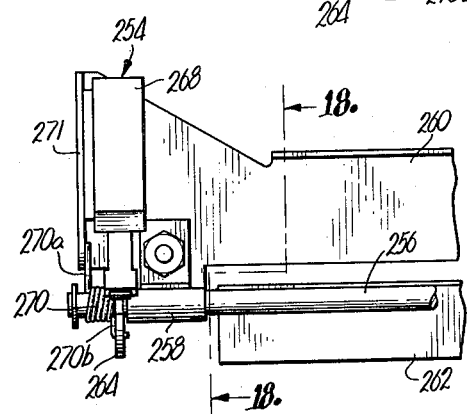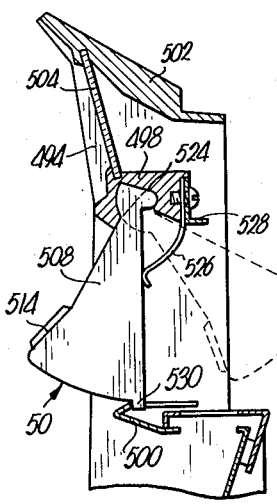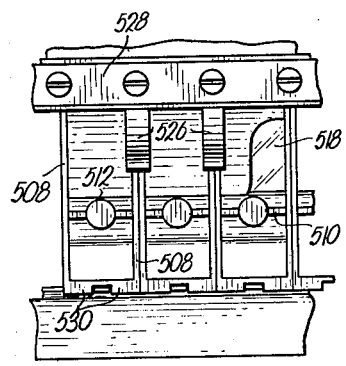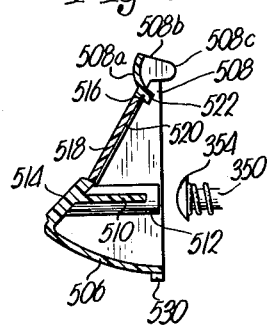

INVENTORS.
Henry J. Albright
Eugene R. Sabin
BY Elmer Bradley Offutt
ATTORNEYS.

March 9, 1965 H. J. ALBRIGHT ETAL 3,172,519
CIGARETTE VENDING MECHANISM
Filed Jan. 18, 1963 11 Sheets-Sheet 6

INVENTORS.
Henry J. Albright
Eugene R. Sabin
Elmer Bradley Offutt
BY
ATTORNEYS.

March 9, 1965  H. J. ALBRIGHT ETAL  3,172,519
CIGARETTE VENDING MECHANISM
Filed Jan. 18, 1963  11 Sheets-Sheet 7

INVENTORS.
Henry J. Albright
Eugene R. Sabin
Elmer Bradley Offutt
BY
Hovey, Schmidt, Johnson & Hovey
ATTORNEYS.

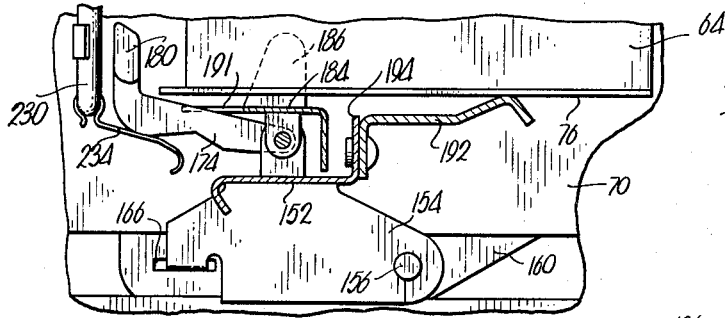
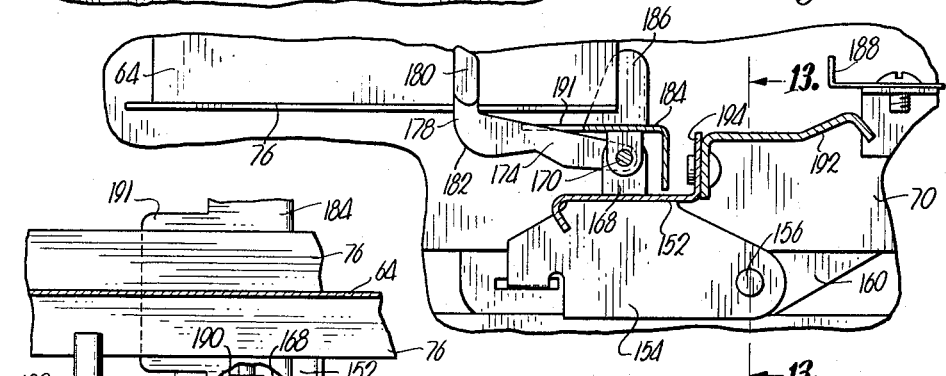
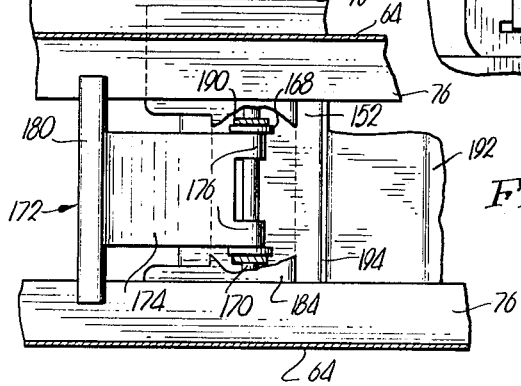
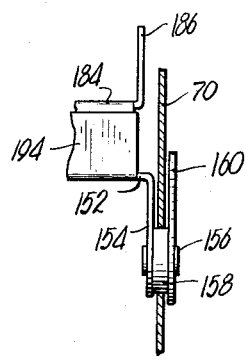
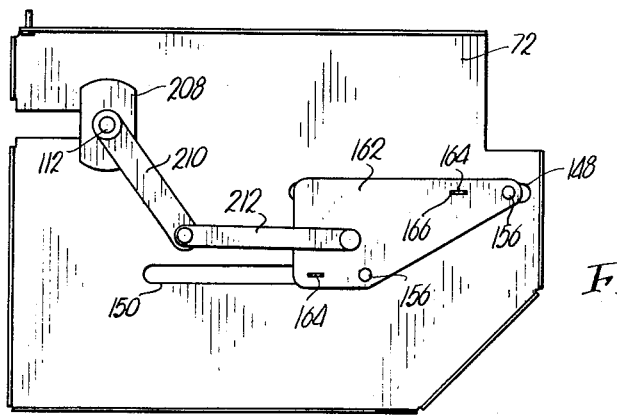

March 9, 1965  H. J. ALBRIGHT ETAL  3,172,519
CIGARETTE VENDING MECHANISM
Filed Jan. 18, 1963  11 Sheets-Sheet 9
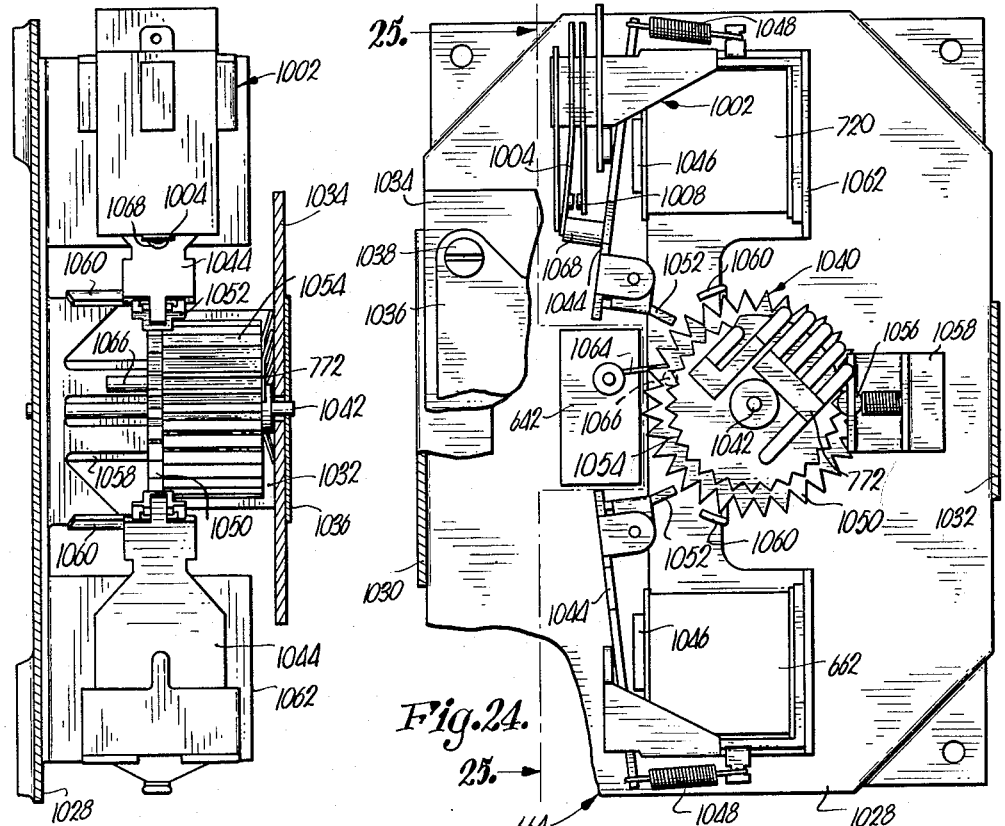
Fig. 24.
Fig. 25.
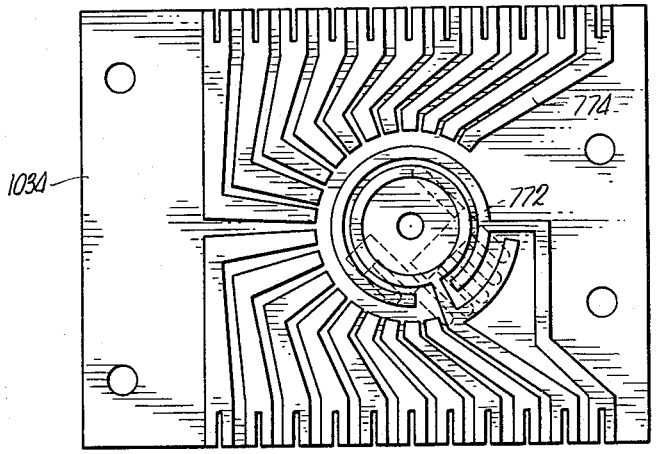
Fig. 26.
INVENTORS.
Henry J. Albright
Eugene R. Sabin
BY Elmer Bradley Offutt
Hovey, Schmidt, Johnson & Hovey
ATTORNEYS.

United States Patent Office

3,172,519
Patented Mar. 9, 1965

3,172,519
CIGARETTE VENDING MECHANISM
Henry J. Albright, Aurora, Ill., Eugene R. Sabin, Prairie Village, Kans., and Elmer Bradley Offutt, Independence, Mo., assignors to The Vendo Company, Kansas City, Mo., a corporation of Missouri
Filed Jan. 18, 1963, Ser. No. 252,389
14 Claims. (Cl. 194—2)

This invention relates to vending equipment and particularly to apparatus adapted for vending a relatively large number of different items at different prices and capable of totalizing the value of money deposited in the machine by a customer, and returning proper change to the person if necessary and which is variable depending upon the price of the article chosen by the customer.

In the vending of items such as cigarettes, it is necessary that the machine for dispensing the individual cigarette packages be constructed to receive a relatively large number of brands of cigarettes, that the capacity of the machine housing be sufficient to hold a considerable number of each type of brand without presenting an unwieldy and unsatisfactory bulk from a commercial standpoint, and that the article vending mechanism be positive in operation to assure delivery of a package of cigarettes to the customer for appropriate deposit. Also, it is highly desirable that the machine be capable of vending different brands of cigarettes at different prices, which can be altered at will depending upon the type of cigarette which it is desired to place in a particular compartment of the machine. It is also of advantage to provide a machine capable of receiving and totalizing the deposit of money exceeding the price of the individual packages of cigarettes in the machine, with the customer receiving proper change equal to the difference between the amount he deposits and the price of a selected package of cigarettes, thereby effecting an increase in the sales potential of the vending machine because persons can purchase a desired brand of cigarettes even though they do not have correct change.

It is therefore the primary object of the present invention to provide a machine especially adapted for vending products such as cigarettes, and including interrelated and cooperable components that interact to accomplish the functions set forth above by accommodating a relatively large number of products such as cigarettes, capable of vending the articles at selectively alterable prices that may differ if desired from one type of article to the other, and with change being returned to the customer if his deposit exceeds the value of an article selected.

It is a further important object of the invention to provide vending apparatus especially adapted for dispensing articles such as packages of cigarettes, wherein the cabinet is of the console type and yet the article selecting controls of the mechanism are in convenient positions for manual actuation by customers without stooping. In this respect, it is an object of the invention to provide a console type vending machine for cigarettes wherein the manually operable selector buttons are located at the upper margin of the cabinet so that the same are readily accessible to a customer. Further objects are the provision of novel means for coupling the individual selector buttons to the vend mechanism of the machine to assure reliable delivery of cigarette packages to a customer and provision for permitting the customer to select another item without redepositing his money, if the brand of cigarettes initially selected by the person is sold out.

An especially important object of the invention is to provide vending apparatus of the character described including novel mechanism for totaling the value of money deposited in the vending apparatus, and capable of returning different amounts of change to the customer depending upon the difference between the price of the article selected and the amount of money initially inserted in the apparatus. The function of returning different amounts of change to the customer when the total deposited is greater than the price of a particular selection is accomplished by novel stepper mechanism involving a movable contact responsive to deposit of money in the machine so that it is first stepped into engagement with a fixed contact corresponding to the amount of money inserted in the mechanism, and is then returned to a fixed contact representing the price of an article selected whereby movement of the movable contact from the contact corresponding to the total deposit to the contact corresponding to the price of the article is employed to effect return of a proper number of change coins to the customer.

Another important aim of the invention is to provide a vending machine wherein one article is ejected from the lowermost extremity of any one of a number of upright stacks of articles housed in the machine, by article ejecting finger means normally movable along parallel paths below respective columns of articles, but with each of the article ejecting finger units being shiftable to an article ejecting location whereby a simple, positive and efficient arrangement of components actuatable by the customer in making a selection may be employed to selectively cam the article ejecting finger means into the article ejecting positions thereof, and thus eliminating costly and troublesome electrically actuated components such as solenoids for shifting the ejecting finger means to the operative positions thereof. It is also an important object to facilitate camming of the individual finger ejecting means into the operative positions thereof by mechanical components wherein the power means for shifting all of the article ejectors through the vend cycle thereof, is adapted to initially shift the article ejecting means rearwardly with respect to the article stacks, then forwardly through an ejecting path, and then finally effecting return of the ejecting fingers to the initial position thereof intermediate the ends of the paths of travel of the same, whereby one of the article ejectors can be cammed into the operative article ejecting position thereof during movement of the ejectors rearwardly from the normal standby positions of the same.

A still further important aim of the invention is to provide vending apparatus of the general character described wherein the article ejectors are all shifted simultaneously but with only one of the ejectors being movable to an article ejecting disposition, and with novel mechanism being operably associated with the article ejectors for maintaining the customer's credit in the machine and permitting him to select another item without reinserting his monetary deposit, if the article ejector movable through an article ejecting cycle, fails to contact and deliver an article from the respective stack and thus requiring only that the customer push another selector button corresponding to a non-sold out selection to obtain a product from the machine. By virtue of this construction, the sales potential of the machine is increased because the customer is not in any way discouraged from selecting an article from the apparatus, even though his original selection is sold out, and also greatly simplifying the vend operation since the customer need only continue to push a different selector button until he receives a product from the machine.

A still further important object of the invention is to provide vending apparatus especially adapted for dispensing cigarettes, wherein is included mechanism for also delivering a booklet of matches to the customer automatically upon dispensing of an individual package of cigarettes.

Also an important aim of the invention is to provide a console type vending machine for cigarettes which may be easily loaded, has a large number of columns for receiving packages of cigarettes in stacked relationship, and includes simple and entirely mechanical means for permitting selective variation of the price at which the packages are vended from the machine.

Other important objects and details of construction of the present apparatus will become obvious or be described in greater detail as the following specification progresses.

In the drawings:

FIGURE 1 is a front elevational view of a console type cigarette vending machine embodying the preferred concepts of the present invention and illustrating one type of front panel usable on the machine;

Figure 2:
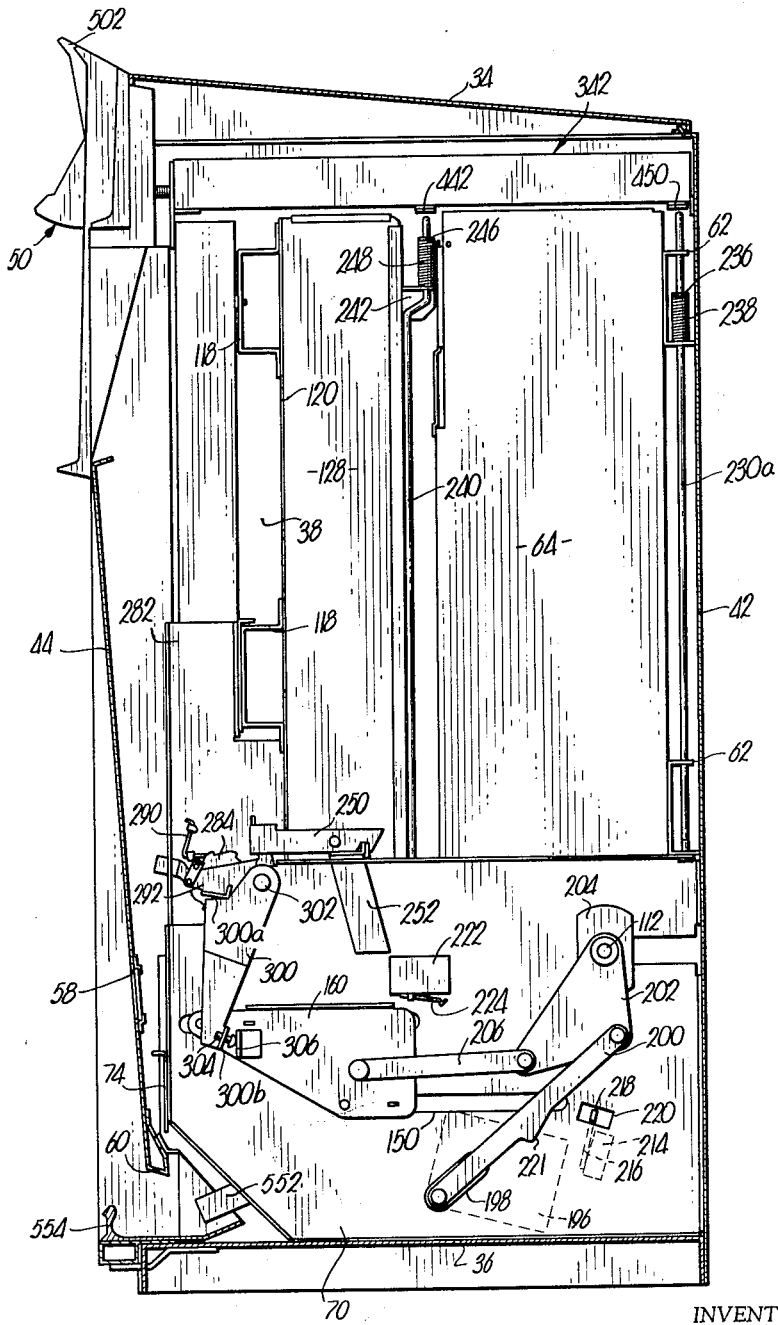
FIG. 2 is an enlarged, vertical cross-sectional view taken on a vertical plane just inside the right-hand side wall of the housing shown in FIG. 1 and looking toward the operating components and dispensing mechanism within the housing.
Figure 3B:
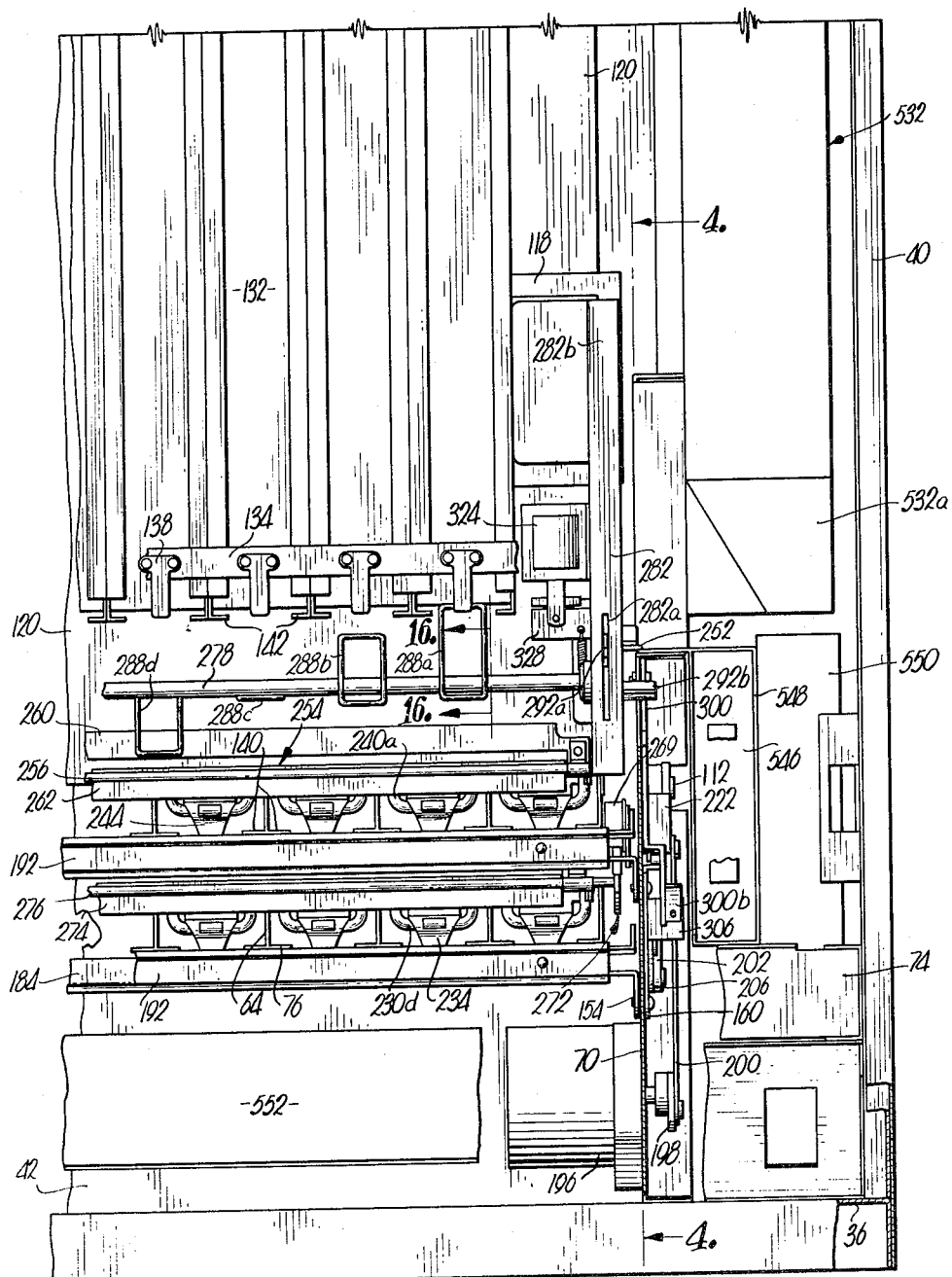
Figure 4:
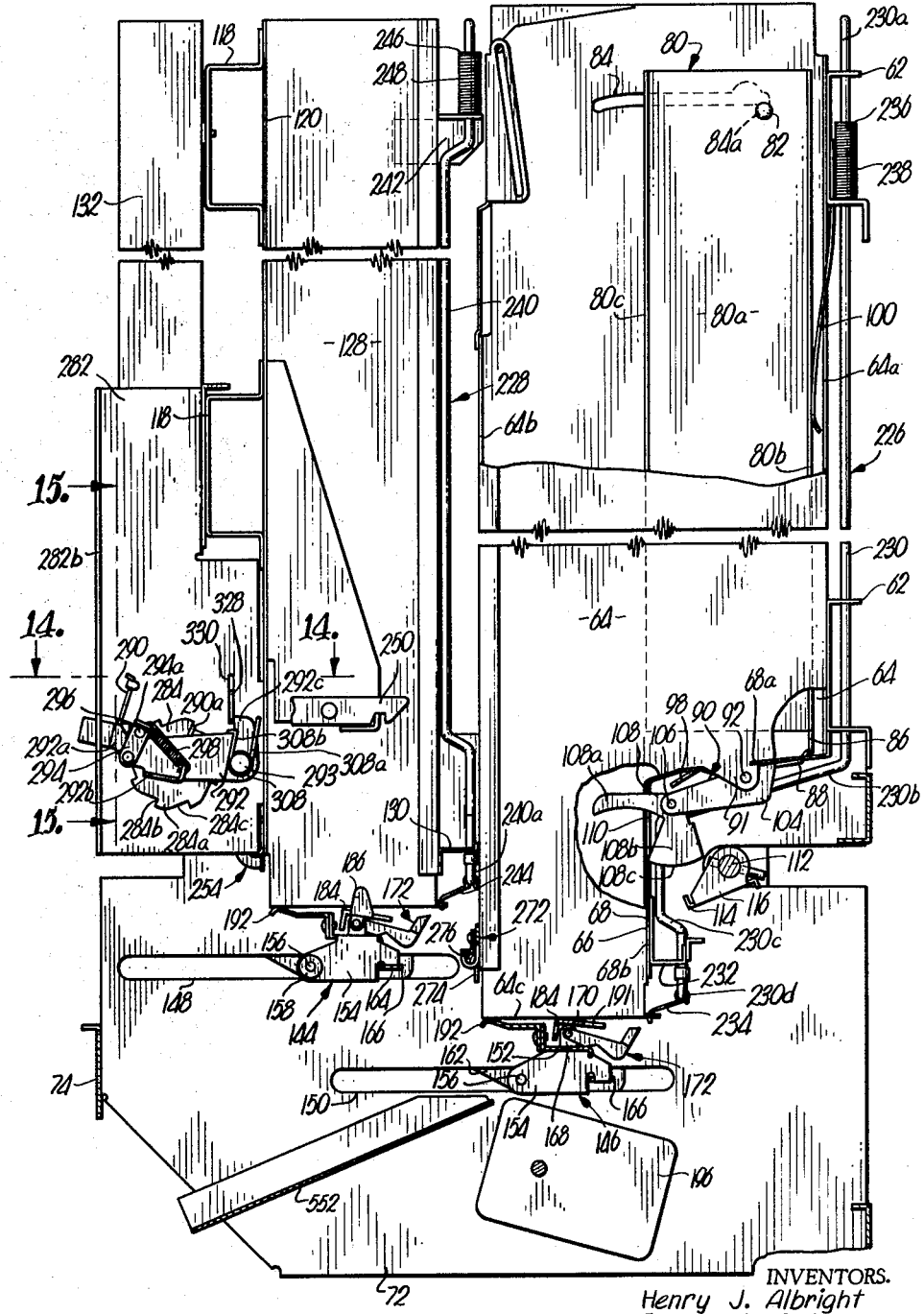
Figure 5:
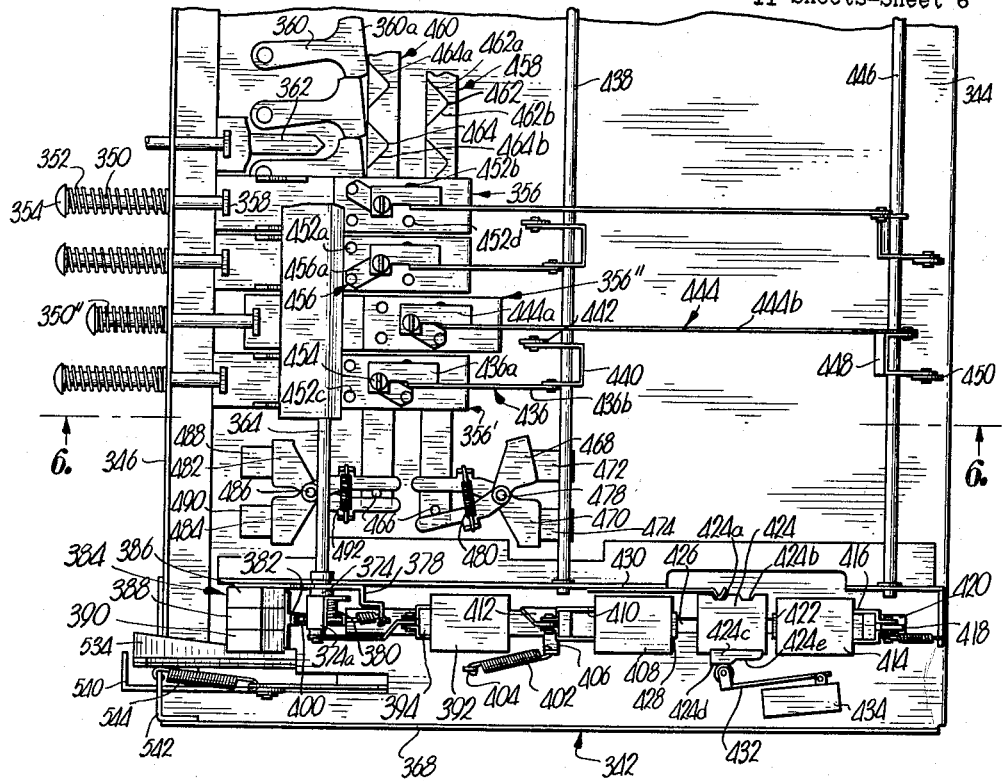
Figure 6:
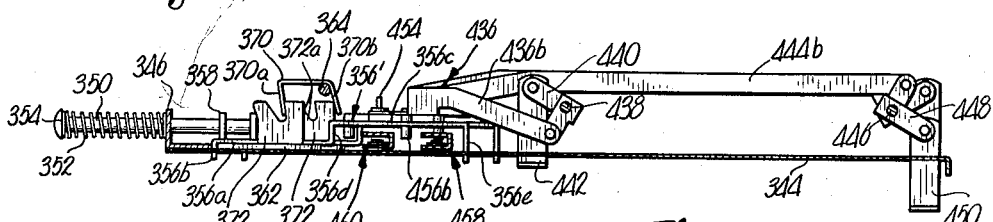
Figure 7:
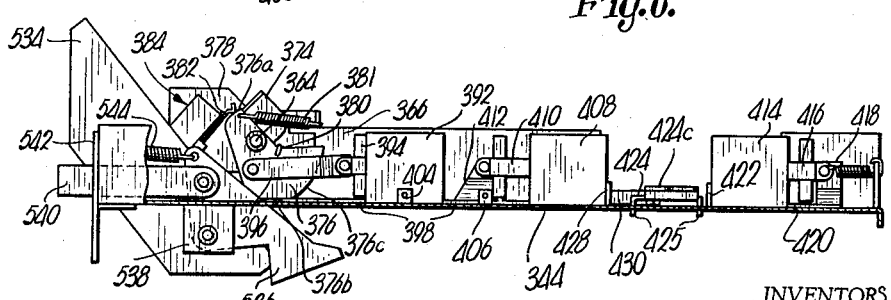
Figure 8:
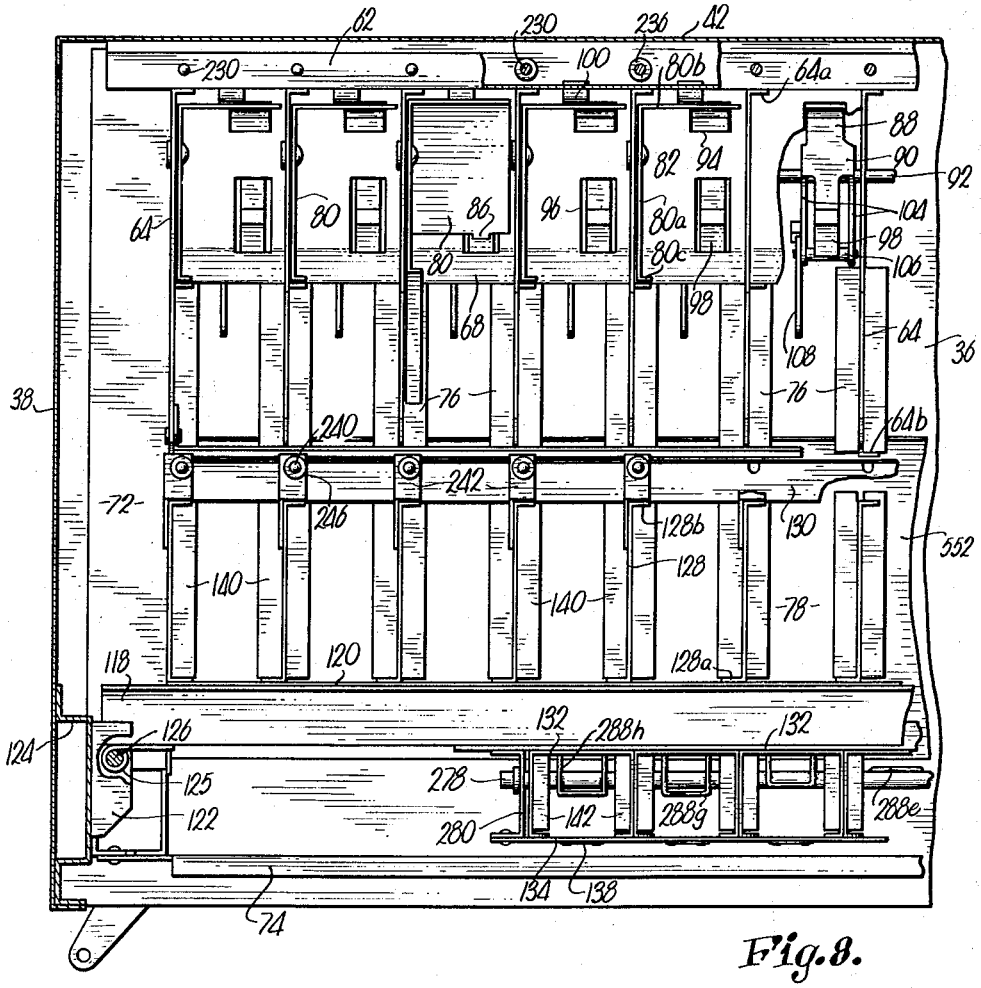
Figures 14, 15, 16:
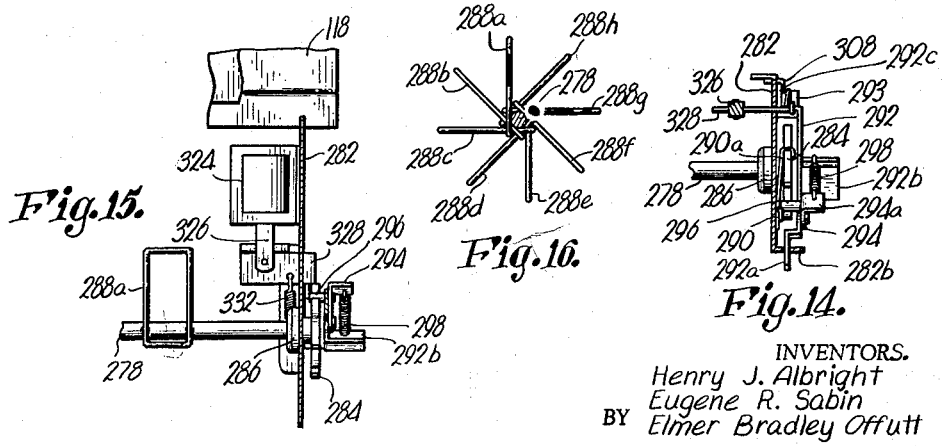
Figure 27A:
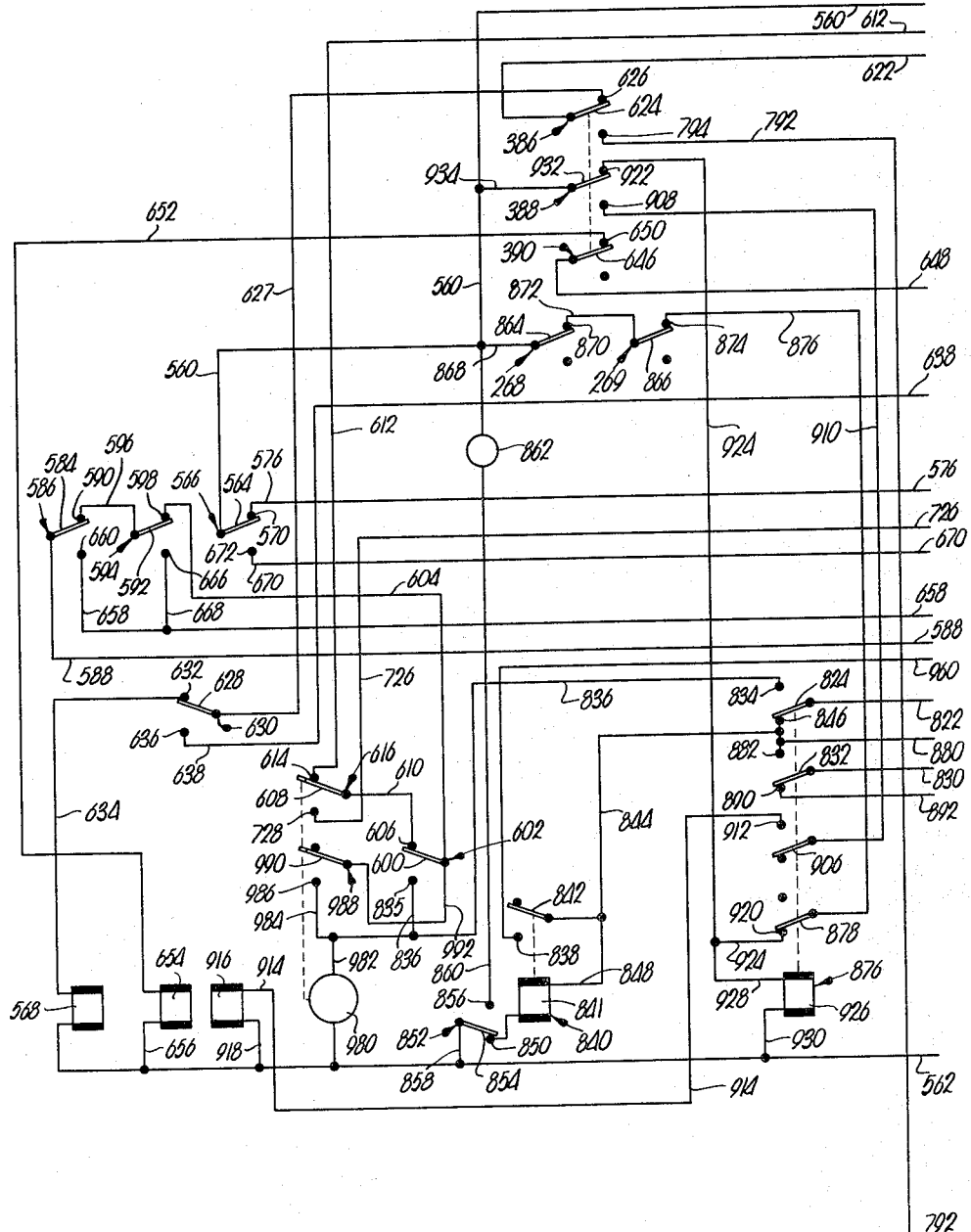
Figure 27B:
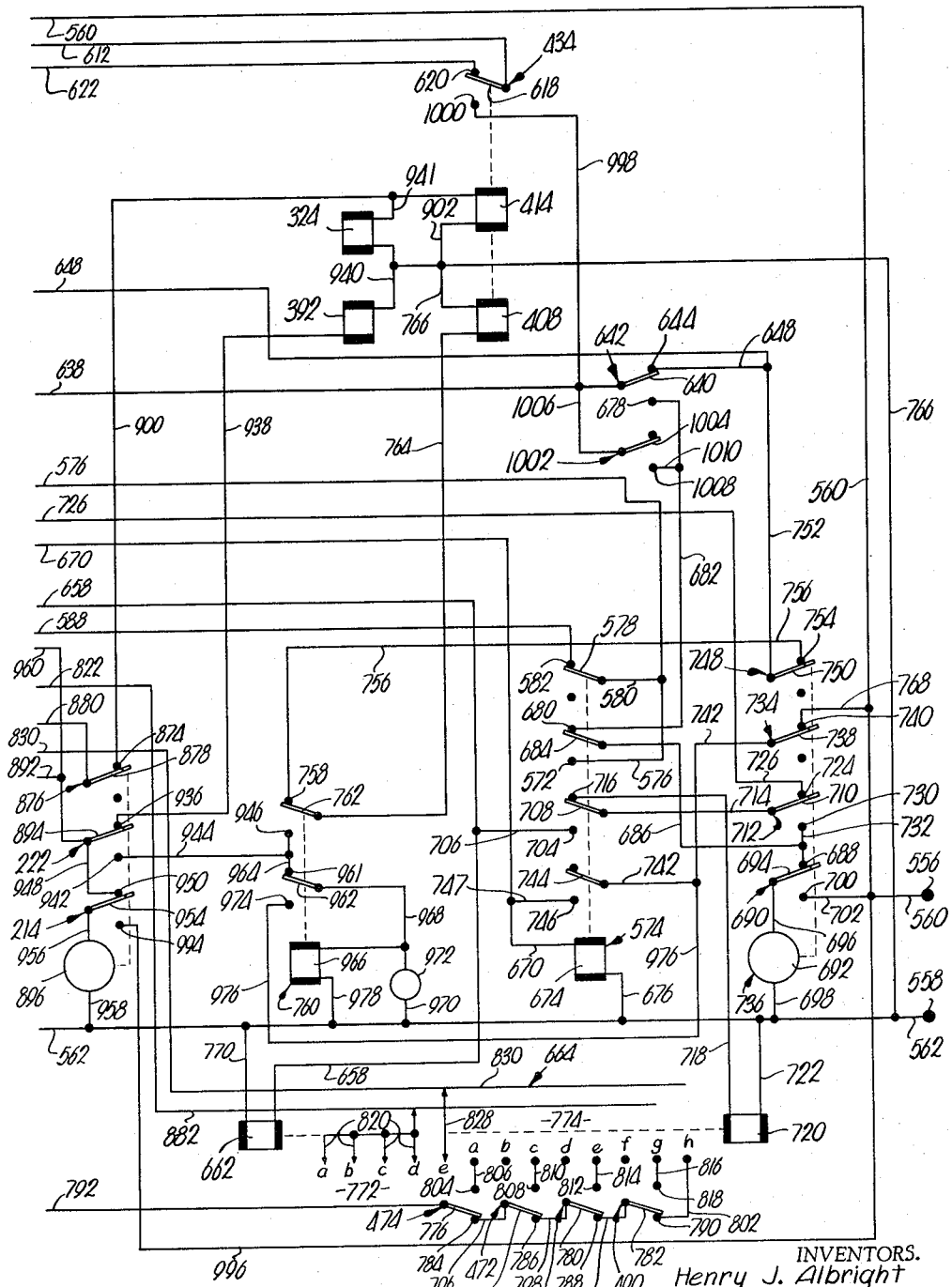

FIGS. 3-A and 3-B comprise an enlarged, fragmentary, front elevational view of the right-hand side of the operating and article storing mechanism of the machine within the housing thereof, and with the front panel of the same removed therefrom;

FIG. 4 is an enlarged, fragmentary, vertical cross-sectional view taken substantially on the line 4—4 of FIG. 3-B and looking in the direction of the arrows;

FIG. 5 is an enlarged, fragmentary, plan view of the right-hand corner of the article selecting, captive link and price setting mechanism of the machine and located immediately below the top wall of the housing shown in FIG. 1;

FIG. 6 is a fragmentary, vertical cross-sectional view taken on the line 6—6 of FIG. 5;

FIG. 7 is an enlarged, fragmentary, vertical sectional view of the structure illustrated in FIG. 5 and taken just inside the side wall of the machine housing and looking toward the operating components carried immediately below the top wall of the housing;

FIG. 8 is an enlarged, fragmentary, horizontal cross-sectional view taken along a horizontal plane immediately below the panel of the mechanism supporting the captive link, selector button and price setting mechanism of the machine, and looking downwardly on the upper extremities of the cigarette package and match receiving columns of the vending apparatus;

FIG. 9 is a fragmentary, end elevational view on substantially the same scale as FIG. 2 and illustrating the opposite side of the lower portion of the article delivery mechanism as shown in FIG. 2;

FIG. 10 is an enlarged, fragmentary, vertical cross-sectional view through the mechanism for ejecting articles from one of the columns in the machine, and illustrating one of the article ejecting fingers at the rearmost end of its path of travel preparatory to effecting ejection of the lowermost article from the column aligned therewith;

FIG. 11 is an enlarged, fragmentary, vertical cross-sectional view substantially identical with FIG. 10 but showing the location of the article ejecting finger during the ejection of the lowermost article from the associated article receiving column;

FIG. 12 is an enlarged, fragmentary, plan view of the structure shown in FIG. 11;

FIG. 13 is an enlarged, fragmentary, vertical cross-sectional view taken substantially on the line 13—13 of FIG. 11;

FIG. 14 is an enlarged, fragmentary, horizontal cross-sectional view taken on the line 14—14 of FIG. 4, looking downwardly in the direction of the arrows, and illustrating the right-hand portion of the match dispensing structure of the vending machine;

FIG. 15 is an enlarged, fragmentary, vertical cross-sectional view taken substantially on the irregular line 15—15 of FIG. 4 and looking inwardly toward the match dispensing structure;

FIG. 16 is an enlarged, fragmentary, vertical sectional view taken on the line 16—16 of FIG. 3-B and looking to the left as indicated by the arrows;

FIG. 17 is an enlarged, fragmentary, front elevational view of a portion of the lower left-hand corner of the structure as shown in FIG. 8 and illustrating the cancel bar member and associated switch structure located at the lower extremities of the front row of cigarette package receiving columns of the machine;

FIG. 18 is an enlarged, fragmentary, vertical cross-sectional view taken on the irregular line 18—18 of FIG. 17;

FIG. 19 is an enlarged, fragmentary, vertical cross-sectional view taken substantially on the line 19—19 of FIG. 1, but showing only the selector buttons of the machine and the supporting structure therefor;

FIG. 20 is an enlarged, fragmentary, rear elevational view of the selector button structure shown in FIG. 19;

FIG. 21 is an enlarged, fragmentary, vertical cross-sectional view substantially schematic in character, showing the internal construction of one of the selector buttons as well as the way in which the same engages a selector rod of the operating mechanism of the machine;

FIG. 22 is an enlarged, side elevational view of the cam and associated switches operably coupled to the pulse timer motor of the electrically operated components of the present mechanism and normally mounted to the right of the article receiving columns of the apparatus;

FIG. 23 is an enlarged, fragmentary, front elevational view of the structure shown in FIG. 2 and illustrating the motor for driving the cam unit;

FIG. 24 is an enlarged, fragmentary, essentially plan view of stepper mechanism forming a part of the pricing structure of the present invention to total the deposit made in the machine by a customer, and to effect return of change coins if required upon selection of a product having a price below the amount deposited in the machine;

FIG. 25 is an enlarged, fragmentary, vertical cross-sectional view taken essentially on the irregular line 25—25 of FIG. 24 and looking inwardly in the direction of the arrows;

FIG. 26 is an enlarged bottom view of a printed circuit board forming a part of the stepper switch apparatus shown in FIG. 24; and FIGS. 27-A and 27-B comprise a schematic showing of the control circuitry of the vending apparatus.

The present vending apparatus is especially adapted for dispensing packages of cigarettes as well as books of paper matches if desired, with a number of vertical columns being provided in the housing of the machine for receiving and supporting a relatively large number of brands of cigarettes and books of matches. Article ejection structure is provided below the columns for ejecting the packages of cigarettes and books of matches from respective columns, with the ejector structure being operated by a single motor and all of the fingers being moved simultaneously by the prime all of the fingers being moved simultaneously by the prime mover during each vend cycle. Selectively operable structure under the control of the customer effects movement of cam means into disposition to cam one of the ejector fingers into a raised ejection position if proper deposit of money has been made in the machine prior to the customer's selection, whereby a package of cigarettes is pushed from the lower extremity of one of the columns by the raised ejector finger and delivered to the customer. The match dispensing mechanism may be deactivated or may be conditioned to automatically dispense a booklet of matches in association with delivery of a package of cigarettes from the machine. The control structure of the machine totalizes the deposit of money in the machine by the customer, and if the price of the article selected is below the amount of the deposit, proper change coins are returned to the customer. Also, the machine goes through a vend cycle even though the column selected by the customer may be exhausted of articles, so as to actuate sold-out indicating structure that operates to retain the customer's credit in the machine so that he may obain another article by actuating a second selector button.

Housing

Vending apparatus broadly designated 30 in the drawing preferably comprises a console type cigarette vending machine having a generally rectangular housing 32 provided with a top wall 34, a bottom wall 36, opposed upright side walls 38 and 40, a rear wall 42 and a front panel or wall 44 hingedly mounted on the bottom wall 36 and side wall 38 for swinging about a vertical axis adjacent the outer margin of wall 38. The front panel 44 is normally locked in position and is swingable outwardly to provide access to the internal operating mechanism of apparatus 30 and the storage columns for packages of cigarettes and match booklets. Four legs 46 secured to bottom wall 36 in supporting relationship to housing 32 are of a length to position the selector buttons of the machine at a convenient height and also prevent excessive stooping over by the customer in order to receive products dispensed from the columns within apparatus 30.

Panel 44 is provided with a generally rectangular, horizontally disposed slot 48 in the upper left-hand corner thereof, which accommodates a plurality of parallel selector buttons broadly designated 50 and which will be described in greater detail hereinafter. A coin slot 52 in the upper right-hand corner of panel 44 is aligned with conventional coin accepting and rejecting structure within housing 32 that accepts genuine coins but rejects slugs and spurious discs to the return chute of housing 32. The front panel 44 also mounts a coin return push button 54.

It is also necessary to meet various licensing laws that the front panel 44 be provided with means therein to permit an examiner to determine if cigarette packages in housing 32 have proper tax stamps thereon, and therefore to this end, panel 44 is provided with a pair of openings 58 covered by glass panels thereover, aligned with the cigarette package receiving columns in housing 32 as will become apparent in the description hereinafter.

A relatively long, narrow, horizontally disposed opening 60 across the bottom of front panel 44 permits the customer to remove cigarette packages and match booklets from the vend chute of apparatus 30 but without obtaining access to the columns for surreptitious removal of articles therefrom without the operating mechanism going through a vend cycle.

Match booklet and cigarette package columns

A pair of horizontal, vertically spaced channels 62 secured to the inner face of rear wall 42 serve to mount a plurality of elongated, upright, generally parallel, transversely U-shaped spacer panels 64 (FIGS. 4 and 8) and which define a series of vertical, horizontally spaced columns for receiving vertical stacks of cigarette packages in vertically aligned relationship. As will be apparent hereinafter, the main planar portions of panels 64 projecting outwardly from channels 62, are of a depth to accommodate two stacks of cigarette packages in a fore and aft direction of housing 32 and structure is provided for shifting the rear stack to the forward area of the panels 64, as soon as the individual front stacks are exhausted of cigarette packages. The transversely bent inner foot portions 64a of each of the panels 64 are shitably secured to the channels 62, while the bent outer foot sections 64b of each panel operate to maintain the packages in a respective column and preclude displacement of more than one package from each column by virtue of the fact that the lower extremities of portions 64a terminate in predetermined spaced relationship from support angles located at the lower end of each of the panels 64.

The panels 64 have notches 66 in the rear, lowermost corners thereof (see FIG. 4) for accommodating an elongated, horizontally disposed, generally L-shaped plate member 68 that extends the full width of the series of panels 64 and suitably secured to the lower margins of panels 64 as well as to the lower edge of the bottom channel 62.

As is apparent from FIGS. 3-B and 8, a pair of upright mounting plates 70 and 72 are secured to the bottom wall 36 in spaced relationship to respective side walls 38 and 40, as well as to the lower channel 62 and to a front, generally horizontal bracing member 74 secured to side walls 38 and 40 and spanning the distance between the latter above bottom wall 36. It is to be noted that the mounting plates 70 and 72 are located adjacent the outermost panels 64 of the horizontally spaced series thereof, with the mounting plate 70 being in greater spaced relationship from wall 38 than the spacing of plate 72 from wall 40. Thus, the plate member 68 substantially spans the distance between mounting plates 70 and 72 with the generally horizontal leg portion 68a of member 68 serving as the support for a vertical stack of cigarette packages between each adjacent pair of panels 64 since the width of leg portion 68a is substantially equal to the longitudinal length of a standard package of king size cigarettes. Also, the generally vertical leg section 68b of plate member 68 operates to present a rear support wall for a forward vertical stack of cigarette packages between each adjacent pair of panels 64.

The structure for supporting the forward column of cigarettes in each of the stacks defined by proximal panels 64, comprises elongated, relatively narrow support members 76 (FIG. 8) secured to the lower margin 64c of the main planar portions of panels 64, although it is to be understood that members 76 may be integral with panels 64 and bent into proper configuration to define planar supports for packages between adjacent faces of panels 64. As is apparent from FIG. 8, the support members 76 are in generally parallel, horizontally spaced relationship to define parallel slots 78 therebetween.

In order to effect shifting movement of a rear column of cigarette packages in each of the stacks between spacer panels 74, a transversely L-shaped column advancing member broadly designated 80 is swingably mounted on each of the spacer panels 64 with the exception of the far righthand panel 64. Each of the column advancing members 80 includes an elongated, main planar section 80a slidably positioned against a corresponding panel 64 and provided with a large headed rivet 82 thereon slidably received in an elongated arcuate slot 84 in the upper extremity of the main planar section of a proximal panel 64. The integral, transversely extending rear leg portions 80b of each of the column advancing members 80 serve as the rear support for packages of cigarettes located in the rear sections of the areas between panels 64, while the relatively short, transversely extending forward legs 80c operate to retain the packages in proper vertical stacked relationship. The column advancing members 80 are of a length such that when the rear leg portions 80b thereof are adjacent channels 62, and the rivets 82 are in the rearmost, downturned segments 84a of slots 84, the lower margin of leg portion 80b is located immediately above the surface of leg portion 68a of plate member 68. A downturned lug 86 on the lower margin of each leg portion 80b of column advancing members 80, is adapted to be releasably positioned behind a corresponding locking lever 90 mounted beneath each of the column advancing members 80. As is most apparent from FIGS. 4 and 8, the locking levers 90 each have an upper generally horizontal leg comprising a rear extension 88 and a forward segment 98 integral with opposed, downturned forwardly projecting connector legs 102 rotatably positioned on a horizontal shaft 92 carried by the ears 91 depending from the lower margins of panels 64 and extending into the notches 66 therein and the leg portion 68b of plate member 68 is provided with a rectangular slot 94 therein for each lever 90 for clearing respective projections 88 while the rectangular slots 96 in the front margin of leg portion 68b are in alignment with and receive the segments 98 of corresponding levers 90. The projections 88 and segments 98 of each lever 90 are located in relative angular relationship causing the projections 88 to be shifted into disposition to engage lugs 86 of column advancing members 80 when the rear column of cigarettes between panels 64 engage and force the segments 98 of levers 90 downwardly into the plane of leg portion 68b.

The forwardly extending legs 104 of each lever 90 mount a cross pin 106 therebetween which serves as means for mounting an irregularly configured, generally L-shaped operating member 108 also positioned below the leg portion 68a of plate member 68. The leg section 68b of plate member 68 is provided with a series of upright, elongated slots 110 therein which normally clear the outer, forwardly extending leg 108a of member 108. A generally triangular lower leg segment 108b of each operating member 108 projects downwardly from a respective leg 108a and is provided with a downwardly facing, generally arcuate margin 108c positioned to be engaged by an operating member as will be explained hereinafter. It is to be pointed out that the operating members 108 are freely rotatable on corresponding cross pins 106 so that upward shifting of the members 108 causes the respective levers 90 to be pivoted about the axis of shaft 92.

The structure for actuating the operating members 108 includes an elongated, horizontal shaft 112 carried by and extending through the mounting plates 70 and 72 below shaft 92, with a generally Z-shaped plate 114 being secured to shaft 112 by mounting lugs 116 so that the plate 114 is rotated about the axis of shaft 112 during rotation of the latter by the vend motor of apparatus 30.

Leaf springs 100 carried by the upper channel 62 and aligned with each of the column advancing members 80, engage the rear leg portions 80b thereof below rivets 82 for biasing advancing members 80 forwardly of the columns defined by the main planar sections of panels 64.

In order to increase the capacity of apparatus 30 and provide a maximum number of cigarette packages to be vended therefrom, additional package column support means is provided within housing 32 forwardly of the panels 64 and preferably swingably mounted on the side wall 38 of housing 32 to provide ready access to the rear cigarette package receiving columns defined by panels 64.

The front column structure includes a pair of elongated, horizontally disposed, parallel, vertically spaced channels 118 secured to and carrying an upright, relatively large rectangular plate 120 affixed to the normally rear surfaces of the channels 118. A pair of generally U-shaped, hinge mounts 122 mounted on a channel 124 on the inner face of side wall 38 adjacent the forwardmost margin thereof, are located in vertically spaced relationship and receive hinges 125 therein secured to each of the channels 118. Hinge pins 126 through the mounts 122 and hinges 125 permit channels 118 and the plate 120 thereon to swing about the vertical axis of pins 126.

The forward cigarette package receiving columns are defined by a series of generally Z-shaped panels 128 having main planar sections located in horizontally spaced, generally parallel relationship and spaced apart a distance approximately equal to the transverse width of conventional packages of cigarettes. The relatively short inner leg portions 128a of each of the panels 128 are secured to the inner face of plate 120, while the opposed, transversely bent leg portions 128b of panels 128, are positioned to retain cigarette packages in the space between the planar sections of panels 128. A horizontal, generally Z-shaped member 130 (FIG. 4) extending across the lower extremities of panels 128 and connected to the leg portions 128b thereof, operates to support panels 128 and also operates as a guide for selector push rods to be described hereinafter.

The book match support columns are mounted on the forward faces of channels 118 and comprise a series of generally U-shaped, elongated elements 132 in abutting, parallel relationship. Elongated, horizontally disposed spacer bar 134 extends across the front, inwardly directed leg portions of elements 132 and serves to stabilize the outwardly projecting main planar legs of the individual elements 132. A series of leaf springs 138 secured to spacer bar 134 intermediate each opposed pair of inwardly directed leg portions of elements 132, depend from spacer bar 134 and terminate adjacent the lower margins of elements 132 to maintain booklets of matches in respective storage columns therefor.

A series of flat, rectangular support members 140 are secured to the lower, horizontal edges of the main planar portions of each of the panels 128 with all of the support members 140 projecting outwardly in opposed directions from panels 128, except the end support members which extend only inwardly toward the adjacent panel 128 as indicated in FIG. 8. The support members 140 are spaced apart a distance equal to the spacing between members 76, and thereby define elongated horizontal slots for clearing article ejecting devices to be described. The elements 132 are also provided with flat, spaced rectangular support members 142 on the lower margins thereof and defining slots therebetween aligned with respective match booklet receiving columns. It can also be appreciated that the end support members 142 also extend only toward the central part of the match booklet supporting columns and that the spacing between adjacent outwardly directed sections of elements 132 is substantially equal to the length of a conventional booklet of paper matches.

As shown in FIG. 3-B, the support members 140 are located in vertically spaced relationship from the support members 76, while the support members 142 are above the lower extremities of the cigarette package columns defined by panels 128. Although the horizontal support members have been described as separate components secured to the lower margins of the upright panels forming the guides for packages of cigarettes, it is to be recognized that the lower extremities of the various panels can simply be bent outwardly to define article supports as described.

*Article ejecting mechanism*

In FIG. 4, the ejector mechanism broadly designated 144 has been illustrated in side elevation, whereas the ejector mechanism 146 is shown in cross-section to more clearly illustrate the configuration of the components thereof. The mounting plates 70 and 72 are provided with a pair of opposed, horizontally aligned, vertically offset, parallel, horizontally located slots 148 and 150 that receive roller means on the ejector mechanisms 144 and 146, for guiding the latter along generally rectilinear, horizontal, reciprocable paths of travel. It is to be noted that the main carrier for the ejector fingers comprises an elongated, horizontal bar 152 having downwardly projecting, generally trapezoidal legs 154 at opposed ends thereof located in positions adjacent the inner faces of the mounting plates 70 and 72 respectively. The legs 154 carry stub shafts 156 on the normally forwardmost extremities thereof, and which serve as means for mounting rollers 158 of a diameter only slightly less than the effective width of the corresponding slots 148 and 150 so that the rollers 158 are free to move along and be guided by slots 148 and 150 as the ejector mechanisms 144 and 146 are reciprocated relative to mounting plates 70 and 72. A pair of relatively large, generally trapezoidal plates 160 and 162 positioned on the outer faces of the mounting plates 70 and 72 respectively, receive the outer extremities of shafts 156 as best shown in FIGS. 2 and 9, so that reciprocation of the plates 160 and 162, causes both of the ejector mechanisms 144 and 146 to be shifted along rectilinear paths defined by slots 148 and 150. The legs 154 of bars 152 also have outwardly directed, integral lugs 164 thereon which extend through corresponding slots 148 and 150, and are received in suitable cutouts 166 therefor in plates 160 and 162, whereby the bars 152 are maintained in horizontal disposition during full reciprocation of mechanisms 144 and 146.

Each of the bars 152 has a plurality of upwardly bent ears 168 struck therefrom with a pair of the ears being provided for each of the package receiving columns defined by corresponding panels 64 and 128. An elongated rod 170 carried by the ears 168 on each bar 152, mount individual pusher fingers broadly designated 172 aligned with the cigarette package receiving columns. As best shown in FIGS. 10 to 12, each of the pusher fingers 172 is of generally T-shaped configuration and includes a generally horizontal leg segment 174 provided with extensions 176 on the outer extremity thereof which rotatably receive the rod 170 therethrough so that each of the pusher fingers 172 may rotate about the axis of a respective rod 170. A generally upright leg section 178 integral with the extremity of a corresponding leg segment 174 remote from rods 170, serves to mount an elongated, horizontal cross head 180 which is adapted to be received between adjacent panels 64 or 128, and of greater width than the spaces between support members 76 and 140 to permit the cross head 180 to be supported by members 76 and 140 during reciprocation of the pusher fingers 172 along a path to effect ejection of an article from one of the columns of apparatus 30. It is to be noted that the pusher fingers 172 may be conveniently molded from a synthetic resin material such as nylon, and of particular note is the way in which the outer faces of cross head 180 and upright leg section 178 of each pusher finger 172 merge smoothly with the lower surface of the leg segment 174 thereof, throughout an arcuate zone 182 which operates as a cam face as will be explained. Since the extensions 176 of each pusher finger 172 are located between the ears 168 of corresponding bars 152, the pusher fingers 172 are free to rotate about the axes of respective rods 170, but are limited against movement longitudinally of the latter.

An elongated pusher finger return bar 184 is pivotally mounted on each of the rods 170 in overlying relationship to pusher fingers 172, to positively assure return of the same to the normal condition thereof after one of the pusher fingers 172 has ejected an article from a cigarette package receiving column. An upwardly extending cam leg 186 on the extremities of the return bars 184 adjacent mounting plate 70, is positioned to engage cam stops 188 on the inner surface of mounting plate 70, for rotating corresponding return bars in a clockwise direction viewing FIG. 4, when the ejector mechanisms 144 and 146 have moved to a point adjacent the forwardmost points of the paths of travel thereof. Downturned lugs 190 on each of the return bars 184 and bracing corresponding rods 170 on bars 152, serve to mount each of the return bars 184 on mechanisms 144 and 146, and spring means, not shown in detail, is provided on each of the return bars 184 and engaging bars 152 for maintaining the return bars 184 in the normal disposition of the same as illustrated in FIG. 4. Spaced, integral, rearwardly extending finger segments 191 on return bars 184 are aligned with support members 76 and 140, and operate to preclude jamming of cigarette packages under cancel bar mechanism to be hereinafter described, during the vend cycle, and especially when the column from which an article is being ejected, contains only a small number of packages to be dispensed.

A generally L-shaped support element 192 secured to the upwardly extending flange 194 of each bar 152, operates as a support for packages of cigarettes during ejection thereof by one of the pusher fingers 172, and maintains the packages in horizontal disposition until the packages are swept from the elements 192 by the cancel bar mechanism forming a part of the dispensing apparatus.

The structure for reciprocating mechanisms 144 and 146, includes an electric motor and gear box unit 196 secured to the inner face of mounting plate 70 adjacent the lower margin thereof and having an output shaft extending through mounting plate 70 below slot 150 therein. A crank arm 198 mounted on the output shaft and rotatable therewith, is pivotally coupled to an elongated link 200 which is in turn pivotally joined to a triangular connector plate 202 secured to the outer extremity of shaft 112 extending through an opening 204 therefor in mounting plate 70. The end of link 200 remote from crank arm 198 is connected to one apex of the connector plate 202, another apex of the triangular plate 202 is mounted on shaft 112, and the third apex of the connector plate is joined by link 206 to a central area of the adjacent plate 160. Thus, during rotation of the drive shaft of unit 196, triangular plate 202 is oscillated about the axis of shaft 112, and the plate 160 is caused to oscillate along a rectilinear path parallel to slots 148 and 150. The end of shaft 112 projecting through clearance opening 208 in plate 72, is also joined to the plate 162 by a pair of interconnected, relatively swingable links 210 and 212. Thus, during oscillation of shaft 112 by crank arm 198, the plate 162 is reciprocated in phase with the plate 160 by the connector links 210 and 212 operably coupled to plate 162. A motor cutoff switch 214 carried by the inner face of mounting plate 70 adjacent unit 196, has a swingable operating arm 216 thereon having an extension 218 on the upper extremity of the same projecting through an opening 220 therefor in mounting plate 70 adjacent the rear end of slot 150 therein. A cam projection 221 on the lower margin of link 200 is located intermediate the ends thereof in disposition to engage extension 218 of arm 216 during oscillation of link 200 by crank arm 198.

Sold-out switch 222 mounted on the outer face of plate 70 above plate 160, has an actuating arm 224 located to be engaged by the upper margin of plate 160 and normally held in one condition of operation thereof, by plate 160.

Selectively actuatable structure is provided for shifting one of the ejector fingers 172 into an article dispensing position, with the structure for camming the fingers 172 of mechanism 146 into location for dispensing of an article, being broadly designated 226, while a similar cam structure for mechanism 144 is denominated 228. The cam structure 226 includes a series of generally Z-shaped rods 230 with one rod being provided for each of the cigarette package receiving columns defined by panels 64. The upper elongated sections 230a of each rod 230 are reciprocable in aligned openings provided therefor through vertically spaced channels 62 with the lower extremities of sections 230a being integral with respective inwardly directed segments 230b underlying leg portion 68a of plate member 68.

A generally U-shaped, upwardly opening foot section 230d is provided on the lower extremity of each of the lower sections 230c of rods 230 with the upwardly extending legs of each section 230d being reciprocably received in suitable openings therefor in a transversely U-shaped, horizontally located member 232 carried by the rear face of leg section 68b of plate member 68. The upwardly extending leg sections of foot sections 230d preclude rotation of rods 230 about the longitudinal axis of section 230a thereof, and maintain the bight portion of each foot section 230d in alignment with the spaces between respective support members 76. Sections 230d each carry a flexible cam element 234 thereon which projects toward the cigarette package receiving columns located forwardly of rods 230. It is to be noted that the leaf cam elements 234 have arcuate, inclined, upper faces to engage the cam faces 182 of pusher fingers 172 to bias the rear portions of pusher fingers 172 upwardly as the ejector mechanisms 144 and 146 are moved rearwardly during the initial segment of the vend cycle of apparatus 30. Although the cam elements 234 can assume various configurations, it is desirable that the same have an arcuate, inclined upper surface positioned to engage the rear, underlying cam surfaces 182 of pusher fingers 172 to effectively cam the same to the upper article ejecting locations thereof.

As shown in FIG. 2, a C-clip or equivalent means 236 is provided on the upper extremity of section 230a of each rod 230 and located within the upper channel 62, so that a coil spring 238 surrounding each rod 230 and located between the upper channel 62 and a corresponding C-clip 236, normally maintains each of the rods 230 in the upper disposition of the same as illustrated in FIGS. 2 and 4.

The rods 240 of cam structure 228, are of generally U-configuration as shown in FIG. 4, and are mounted for vertical reciprocation between member 130 and brackets 242 secured to the panels 128 adjacent the upper extremities thereof. The rods 230 are substantially aligned with the rods 240. The lower sections 240a of the individual rods 240 are of generally U-shaped configuration similar to foot sections 230d of rods 230, and are reciprocably received in suitable openings therefor in the member 130 to preclude rotation of rods 240 about the longitudinal axis of the main segments thereof. Cam elements 244 secured to the bight segments of the foot sections 240a of rods 240, are identical with cam elements 234, and project toward the columns defined by panels 128, for camming the pusher fingers 172 of ejector mechanism 144, into the article ejecting locations of the same. C-clips 246 on the upper ends of each of the rods 240, above brackets 242, serve as the upper retainer for coil springs 248 engaging brackets 242 to thereby maintain rods 240 in the upper positions of the same as is illustrated in FIG. 4.

It should be noted at this juncture that the cam elements 234 and 244 are located above the normal paths of travel of respective pusher fingers 172 aligned therewith, so that during reciprocation of mechanisms 144 and 146, the cross heads 180 of pusher fingers 172 are moved below the support members 76 and 140 of the article receiving columns. Also as shown in FIG. 4, a latch member 250 pivotally mounted on the panel 128 proximal to mounting plate 170, is adapted to releasably engage an L-shaped lug 252 carried by mounting plate 70 adjacent the upper edge thereof.

Cancel bar structure broadly designated 254 is provided across the forwardmost, lower margins of the panels 64 and 128 for sensing delivery of a package of cigarettes therefrom. The front cancel bar structure 254 as shown in FIGS. 3-B, 17 and 18, includes an elongated, horizontal rod 256 carried by horizontally spaced and aligned brackets 258 located at opposite ends of a horizontal mounting member 260 secured to the lower margin of plate 120 and extending the full width thereof. The rod 256 carries a generally L-shaped cancel bar 262 which normally depends from rod 256 and is rotatable therewith. It should be pointed out that the rod 256 is spaced from the upper faces of support members 140, a distance only slightly greater than the normal thickness of a package of cigarettes to be vended from apparatus 30 so that the cancel bar 262 will operate to preclude displacement of more than one package of cigarettes from a respective column by a pusher finger 172 during operation of mechanism 144. The rod 256 and cancel bar 262 extend the full width of the front cigarette package receiving columns, and a cam 264 secured to the left-hand extremity of rod 256, is disposed to operably engage a switch actuating arm 266 of switch 268 mounted on a bracket 271 projecting outwardly from the adjacent extremity of member 260. Coil spring 270 around the end of rod 256 adjacent switch 168, has a leg 270a in engagement with member 260, and a second leg 270b hooked into cam 264 for normally maintaining the cancel bar 262 in engagement with the forward margins of panels 128.

The cancel bar structure broadly designated 272 associated with the rear article receiving columns, is substantially identical with structure 254, in that a rotatable cancel bar 274 is carried by a rod 276 extending the full width of the rear article receiving columns, but the sensing switch therefor is located on the right side of the apparatus 30 viewing housing 32 from the front thereof, and again, it is to be noted that the spacing between bar 276 and the support members 76 is only slightly greater than the thickness of a package of cigarettes.

*Automatic match dispensing mechanism*

The structure for automatically ejecting match booklets one at a time from the columns defined by elements 132 in association with dispensing of packages of cigarettes, includes a horizontally disposed shaft 278 carried by an upright bracket 280 depending from the lower extremity of the left-hand element 132, and a generally Z-shaped mounting bracket 282 secured to the lower channel 118 and the right-hand lowermost corner of plate 120. The right-hand extremity of shaft 278 mounts a ratchet wheel 284 having a cylindrical boss 286 thereon rotatably positioned in a suitable opening therefor in the main planar surface of bracket 282. The shaft 278 carries a series of generally rectangular match booklet ejectors 288a to 288h respectively, as shown in FIG. 16, with one ejector 288 being provided for each column of match booklets supported by members 142 located on the lower margins of the elements 132. The ejectors 288 are arranged in spiral disposition along the length of shaft 278 with each ejector at an angle of approximately 45° with respect to the next adjacent ejector.

The ratchet wheel 284 has a series of teeth 284a thereon, each defined by a generally radial shoulder 284b, and an arcuate surface 284c leading from the inner edge of one shoulder 284a to the outer margin of the next adjacent shoulder. An anti-backup element 290 is mounted on the outer face of bracket 280 and includes a bent leg 290a disposed to engage one of the shoulders 284b to preclude rotation of ratchet wheel 284 in a clockwise direction viewing FIG. 4.

Means for effecting rotation of the ratchet wheel 284 comprises an irregularly configured latch and cam member 292 carried by a horizontal stub shaft 293 on bracket 280 rearwardly of the axis of rotation of ratchet wheel 284. The forwardmost end 292a of member 292 extends through a guide slot 282a therefor in the flange 282b of bracket 282. A latching pawl 294 is pivotally mounted on end 292a of member 292 and carries a pin 296 extending toward ratchet wheel 284 in disposition to engage a shoulder 284b thereon. Coil spring 298 between outwardly bent flange 292b of member 292, and the outwardly extending flange 294a of pawl 294, biases the latter in a clockwise direction as shown in FIG. 4 to maintain pin 296 behind the proximal shoulder 284b of ratchet wheel 284.

The actuating means for member 292 comprises a component 300 mounted for swinging movement on plate member 70 about the axis of a pin 302 carried by plate 70 adjacent ratchet wheel 284 with component 300 having a cam edge 300a thereon positioned to engage the flange 292b of member 292. An outwardly directed flange 300b on the lower extremity of component 300 mounts a screw 304 disposed to be engaged by an outwardly struck lug 306 on the left-hand end of plate 160 viewing FIG. 2 whereby the component 300 is oscillated in response to reciprocation of plate 160. It is to be noted that the throw of component 300 may be adjusted by varying the location of screw 304 in flange 300b. Coil spring 308 surrounding stub shaft 293, has a leg 308a hooked in bracket 282 and a leg 308b engaging the upper margin of latch and cam member 292 for biasing the latter in a counterclockwise direction as shown in FIG. 4.

The mechanism for latching member 292 against rotation under the influence of spring 308, includes a solenoid operated retainer on bracket 280. The solenoid 324 secured to the rear face of bracket 282 behind element 310, has a reciprocable armature 326 operably connected to a retainer element 328 extending through bracket 282 and reciprocable in a vertical slot 330 therein. The retainer element 328 is positioned to be within the path of travel of a locking extension 292c of latch and cam member 292 when the armature 326 is at the lower end of its path of travel. Coil spring 332 secured to retainer element 328 adjacent bracket 282, and also connected to an extension of stub shaft 293 projecting through bracket 282, normally maintains armature 326 at the lower end of its path of travel as shown in FIG. 15.

*Manually actuatable selector mechanism*

The structure for reciprocating rods 230 and 240 includes selectively actuatable mechanism broadly designated 342 in FIG. 5 and carried by a generally horizontally disposed tray 344 carried by the side walls 38 and 40, and the rear wall 42 above the upper extremities of the article receiving columns defined by panels 64 and 128. Tray 344 has an integral, upstanding, transversely extending front flange element 346 thereon of generally L-shaped configuration and having a series of apertures 348 in the upright portion thereof adapted to receive corresponding horizontally spaced, parallel, individually reciprocable push rods 350 which project forwardly of flange element 346 as shown in FIG. 5. One push rod 350 is provided for each of the rods 230 and 240, and similarly, the rods 350 are aligned with the selector buttons 50 so that customer-depression of one of the buttons 50 effects reciprocation of a respective push rod 350 in flange element 346. Coil springs 352 surrounding each of the push rods 350 and located between the upright portion of flange element 346 and an enlarged head 354 on the outer extremity of each push rod 350, cause the latter to be biased outwardly into disposition to be engaged by one of the selector buttons 50 upon actuation thereof by a customer.

The innermost ends of push rods 350 overlying tray 344, are connected to connector elements 356 arranged in side-by-side, parallel relationship and slidable along rectilinear paths of travel. Each of the connector elements 356 has a forward, horizontal, elongated segment 356a in relatively close spaced relationship from the upper surface of tray 344, and provided with a downturned forward terminal end section 356b slidable in an elongated notch therefor in tray 344. A rear elongated segment 356c of each element 356 is spaced from the planar face of tray 344 a distance greater than the segment 356a, and is connected to the latter by an upright, intermediate section 356d integral with the rear and forward extremities of segments 356a and 356c respectively. A downturned end 356e on the rearmost end of each segment 356c, also extends through a slot therefor in tray 344 parallel with the slot for the corresponding end 356b and aligned therewith, whereby the connector elements 356 are movable in a direction fore and aft only of tray 344. Although not illustrated in detail in the drawings, it is to be understood that the ends 356b and 356e of each connector element 356 are of generally T-configuration with the lower cross head portion thereof of greater width than the slots receiving ends 356b and 356e, so that the elements 356 cannot be removed from tray 344 unless the flange element 346 is disconnected from tray 344, inasmuch as the enlarged segments of the slots for receiving ends 356b and 356e, are normally not traversed by the T-shaped ends of connector elements 356 because of engagement of segments 356a with flange element 346 as is apparent from FIG. 6.

Upstanding lugs 358 on the forwardmost end of each of the segments 356a of elements 356, receive the proximal ends of push rods 350 therein, so that upon reciprocation of any one of the rods 350, the connector element 356 joined thereto is reciprocated in the guide slots provided therefor in tray 344.

A series of interacting captive links 360 are pivotally secured to the upper face of tray 344 in direct underlying relationship to the segments 356a of connector elements 356, with operation of more than one push rod at a time being prevented by wedge members 362 secured to the underside of corresponding segments 356a and movable between the enlarged head sections 360a of links 360 to spread the latter relatively as one of the connector elements 356 is moved rearwardly by a push rod 350 associated therewith. Spreading of a pair of adjacent captive links 360 by a wedge member 362 causes the remaining captive links 360 to move into disposition preventing more than inconsequential movement of the other connector elements 356.

Structure for locking one of the connector elements 356 in the fully actuated position thereof, includes an elongated, horizontal shaft 364 (FIGS. 5 to 7) carried by an upstanding flange on the left side margin of tray 344 and an upright mounting plate 366 located on the opposite side of connector element 356 in parallel spaced relationship to the right-hand side flange 368 of tray 344. As shown in FIG. 6, the shaft 364 overlies the sections 356d of connector elements 356 when the latter are in the normal unactuated positions thereof, and spans the full width of the manually actuatable selector structures. An elongated, transversely U-shaped member 370 is secured to shaft 364 in a manner so that the opposed legs thereof depend from shaft 364 and project toward connector elements 356, with member 370 extending the full width of the series of push rods 350. It is to be understood that the member 370 may be made up of a number of individual segments if desired, since it may be deemed necessary to provide a central support for shaft 364 intermediate the ends thereof. The spaced, upright legs 370a and 370b of member 370 are cooperable with irregularly configured upstanding ear sections 372 on opposed side edges of the segments 356a of each connector element 356 as best shown in FIG. 6. Each of the ear sections 372 of connector elements 356 have downwardly opening notches 372a therein disposed to receive leg 370a of member 370 therein when one of the push rods 350 is operated to shift the connector element 356 secured thereto, into the innermost disposition of the same as shown in FIG. 6. The ear sections 372 of actuated connector element 356 are located between legs 370a and 370b to preclude return of the associated push rod 350 to the normal location of the same until after the shaft 364 has been rotated to a location clearing the respective ear sections 372.

Mechanism controlling rotation of shaft 364 and the member 370 thereon, includes a generally L-shaped clutch member 374 secured to shaft 364 adjacent the outboard side of mounting plate 366, and having an outer, outturned segment 374a overlying a generally L-shaped cam member 376 rotatably mounted on the outer end of shaft 364. Coil spring 380 surrounding shaft 364 between cam member 376 and clutch member 374, has a leg bearing against the upright portion of clutch member 374, and another leg which bears against the cam member 376 to bias the components in opposite directions. Bracket 378 carried by mounting plate 366 above shaft 364 has an outwardly bent leg receiving one end of a coil spring 381 which is also connected to the upper end of cam member 376 as is clear from FIG. 7. The cam surface 376a of cam member 376 is positioned to operate an actuating arm 382 on switch unit 384 carried by bracket 378 forwardly of cam member 376. The switch unit 384 includes three lock bar switches 386, 388 and 390 that are actuated in concert by the arm 382 engaging cam surface 376a of cam member 376.

A solenoid 392 mounted on tray 344 between mounting plate 366 and side flange 368 rearwardly of shaft 364, has a shiftable armature 394 connected to cam member 376 at a point directly below the axis of pivoting thereof, by a link 396 that operates to rotate cam member 376 in a counterclockwise direction viewing FIG. 7, upon energization of solenoid 392 to retract the armature thereinto. The coil spring 380 operates to normally maintain armature 394 in the outer disposition of the same.

Mechanical mechanism for maintaining cam member 376 in the location of the same illustrated in FIG. 7, includes an elongated slide plate 398 shiftable fore and aft of tray 344 beneath solenoid 392 and movable beneath the flat cam face 376b of cam member 376. The tray 344 is provided with an elongated slot 400 therein directly beneath the cam member 376 for clearing the arcuate cam face 376c during rotation of cam member 376 in a counterclockwise direction under the influence of spring 380. Coil spring 402 secured to a tab 404 on the outer side of solenoid 392, and to a projection 406 on slide plate 398, biases slide plate 398 toward cam member 376, while the solenoid 408 having a retractable armature 410 connected to upstanding ear 412 on slide plate 398, operates to shift plate 398 away from cam member 376 by virtue of the disposition of solenoid 408 rearwardly of solenoid 392.

A mechanical relay on tray 344 behind solenoid 408 takes the form of a solenoid 414 having a rearwardly reciprocable armature 416 connected to an upstanding lug 418 secured to a rear slide element 420 shiftable below solenoid 414 and having an upright flange 422 on the forwardmost extremity thereof.

The flange 422 is engageable with a control plate 424 having a pair of opposed, front and rear depending legs 425 which are received within and retained by a pair of guide slots 426 in tray 344. The front margin of control plate 424 is engageable with the upstanding flange 428 on the rear margin of slide plate 398 so that the control plate 424 is shifted rearwardly in response to retraction of armature 410 in solenoid 408. A leaf spring retainer 430 secured to upstanding mounting plate 366 adjacent solenoid 408, is disposed to engage one of two notches 424a and 424b in the adjacent side of control plate 424. The opposite side margin of plate 424 has an integral, generally L-shaped, upturned cam segment 424c thereon provide with offset cam surfaces 424d and 424e adapted to operably engage the actuating arm 432 of a correct price switch 434.

The structure for effecting reciprocation of corresponding rods 230 and 240 by connector elements 356, includes opeating linkage best shown in FIGS. 5 and 6. The connector element 356' in closest proximity to mounting plate 366 is adapted to actuate the right-hand rod 240, and therefore includes a connector link 436 provided with a horizontal segment 436a adapted to be secured to the segment 356a of connector element 356' as will be explained, and a rearwardly extending, upright connector section 436b extending rearwardly from connector element 356 and terminating adjacent a horizontal rod 438 between the left-hand side flange of tray 344 and mounting plate 366. The rear extremity of the section 436b is pivotally joined to a generally U-shaped connector 440 rotatably positioned on rod 438 and having a forwardly extending leg swingably coupled to a vertically movable pusher 442 extending through tray 344 directly above the right-hand rod 240, as shown in FIG. 2. During reciprocation of the connector element 356', the connector link 436 is shifted rearwardly to rock connector 440 about the axis of rod 438 and thereby shift pusher 442 downwardly into engagement with the right-hand rod 240. It is to be understood that alternate connector elements 356 from the right-hand side of housing 32 toward the left side thereof, are operably associated with rods 240 for reciprocating the latter.

The other alternate connector elements 356 are adapted to shift the rods 230, and with reference to the element 356" adjacent connector element 356', it can be seen that the elongated connector link 444 has a horizontal segment 444a identical with segment 436a and coupled to an upright, rearwardly extending link segment 444b terminating adjacent a rear cross rod 446 located above rods 230 and carried between the left-hand side flange of tray 344 and an upstanding portion of mounting plate 366 adjacent the rear margin of tray 344. The rear end of link segment 444b is pivotally joined to a generally U-shaped connector 448 rotatable about the axis of rod 446 and provided with a leg swingably joined to a vertically reciprocable pusher 450 extending through tray 344 and disposed to engage the right-hand push rod 230 as also shown in FIG. 2.

As is best shown in FIG. 5, each of the connector elements 356 is provided with four apertures 452a to 452d inclusive in each segment 356c thereof and located at the corners of an imaginary rectangle. A threaded aperture in the segment 356c of each connector element 356 and located centrally of the apertures 452a to 452d is adapted to receive a threaded element 454 that extends through the respective segment 436a and 444a of links 436 and 444 for connecting the latter to corresponding elements 356. However, a pricing element is positioned between the segments 436a or 444a and a corresponding element 356 to permit the prices of the articles sold from apparatus 30 to be varied. Each of the pricing elements designated 456 includes a planar segment 456a adapted to be positioned over the segments 356c of connector elements 356 and provided with an aperture (not shown) therein located to clear a corresponding threaded element 454, to secure a corresponding pricing element 456 to the respective connector element 356. A pin 456b projecting outwardly from the end of each segment 456a is spaced from the aperture in segment 456a a distance to be received in one of the apertures 452a to 452d inclusive. Thus, the pin of each pricing element 456 projects downwardly through the segment 356c of a connector element 356 as is most apparent from FIG. 6.

A pair of elongated, parallel, longitudinally reciprocable pricing members 458 and 460 are located beneath the segments 356c of elements 356 and reciprocable transversely thereof depending upon the settings of pricing elements 456. The members 458 and 460 are of generally U-shape in cross-section and have a series of forwardly facing V-notches 462 and 464 in the upper legs respectively thereof, with a pair of notches 462 and 464 being provided for each connector element 356 and disposed in alignment therewith fore and aft of tray 344. The inclined cam surface 464a of member 460 is disposed to be engaged by the pin 456b of a respective pricing element 456 when the pin 456b is located in an aperture 452a of the respective selector structure, and the aligned surfaces 462a, 462b and 464b are successively engaged upon movement of the pricing element to dispose the pin portion 456b thereof in successive apertures 452b, 452c, and 452d.

The extremities of pricing members 458 and 460 adjacent mounting plate 366 project beyond connector element 356' and carry upstanding pins 466 thereon which are disposed to engage the actuating elements of pricing switches mounted on tray 344. The pin 466 on pricing member 458 is normally located between the legs of a pair of L-shaped actuators 468 and 470 which are operably associated with price switches 472 and 474 located beneath rod 438. The actuators 468 and 470 are pivotal about a common upright support pin 478 on tray 344, and are biased in opposite directions by coil spring 480 interconnecting the leg portions of actuators 468 and 470 forwardly of support pin 478. Similarly, a pair of actuators 482 and 484 are positioned to be pivoted about a support pin 486 therefor during reciprocation of pricing member 460, with the actuators 482 and 484 being operably associated with a pair of pricing switches 488 and 490 also located on tray 344 forwardly of shaft 364. Coil spring 492 interconnecting the leg portions of actuators 482 and 484 between support pin 486 and pin 466 on pricing member 460, bias actuators 482 and 484 in opposite directions. It is to be understood that during reciprocation of the pricing members 458 and 460, the pins 466 thereon engage one of the actuators 468, 470, 482 or 484 to swing the latter about corresponding pins 478 and 486, to thereby permit the contacts of the pricing switches to change condition and with the actuating arms of the pricing switches facing in opposite directions to avoid any problem of over-travel of the actuators under the influence of pricing members 458 and 460.

The structure for mounting selector buttons 50 includes a pair of upright members 494 and 496 secured to the main section of front panel 44, or integral therewith, and serving as means for mounting an upper horizontal, transversely irregular casting 498 spanning the distance between members 494 and 496, as well as a lower sheet metal element 500 spaced below casting 498 and parallel therewith. The upper horizontal casting 502 between members 494 and 496 receives one margin of a translucent display sign 504 which also is complementally received in casting 498 so that the sign can be lighted from a fluorescent tube carried by suitable brackets therefor on front flange element 346 of tray 344. The individual selector buttons carried by casting 498 are of special configuration permitting ready removal of the same from panel 44 for change of the brand strip carried therein. As best shown in FIGS. 19 to 21, each of the selector buttons 50 is of transversely triangular configuration and includes an arcuate bottom wall 506 integral with a pair of opposed, parallel, generally triangular side walls 508 which are interconnected by a transversely extending internal cross wall 510 integral with a horizontal boss 512 extending rearwardly from the front wall 514 which merges with side walls 508 and bottom wall 506. The upper portion of the front wall 514 of each button 50 is provided with a rectangular aperture 516 therein which is closed by a transparent window 518 located at an angle with respect to the vertical when each of the buttons 50 is in the normal position thereof, so that a customer may readily view a translucent brand strip received within opposed upright notches 520 in the inner surfaces of side walls 508 adjacent window 518. Crosspiece 522 spanning the distance between side walls 508 adjacent the upper margin of front wall 514 serves to maintain the upper end of a brand strip in proper disposition in notches 520.

The upper extremities of side walls 508 are configured to present an outer, arcuate face 508a that merges with a rearwardly directed, relatively straight margin 508b which joins a circular rear edge 508c extending inwardly and terminating at the relatively straight, rear, upright edges of side walls 508. The front wall 514 of each button 50 is of transverse configuration substantially complemental to the arcuate surfaces 508a of side walls 508. As shown in FIG. 19, the casting 498 is provided with a downwardly facing, longitudinally extending, continuous slot 524 therein adapted to complementally receive the upper ends of each of the buttons 50 for retaining the upper ends thereof in the groove 524 without interfering with swinging movement of the buttons 50 about an axis through the upper sections of side walls 508. A series of retainer clips 526 of longitudinally curved configuration are mounted on the rear margin of casting 498 by clamp bar 528 and aligned with and bearing against adjacent outer edges of side walls 508 for maintaining the lower downwardly directed lip segments 530 of buttons 50 in engagement with the upper edge of sheet metal element 500. As shown in FIG. 21, the bosses 512 of buttons 50 are in direct alignment with corresponding push rods 350, so that inward movement of one of the selector buttons 50 causes the rod 350 aligned therewith to be shifted inwardly to effect ejection of an article as will be explained.

*Coin controlled mechanism and product delivery structure*

A conventional coin accepting and rejecting unit designated 532 in FIGS. 3-A and 3-B and capable of returning change coins to the customer, is mounted within housing 32 adjacent side wall 40 and immediately beneath tray 344. It is preferable that the coin accepting and changing unit be mounted between tray 344 and mounting plate 70 for swinging movement into the area normally occupied by the right-hand panels 128, to provide access to the changer and acceptor when the front columns are swung out of housing 32. Mechanism for accepting genuine coins and rejecting spurious discs is provided at the upper part of unit 532 in alignment with a coin chute 534 carried by tray 344 and in turn communicating with the coin slot 52 on front panel 44 of housing 32. A lever arm 536 (FIG. 7) mounted on a bracket 538 depending from tray 344 adjacent the right-hand corner thereof, is positioned to operate the scavenge arm of unit 532 when lever arm 536 is rocked by a push link 540 pivotally connected to the upper end of lever arm 536 and extending forwardly therefrom through a bracket 542 depending from the forward edge of tray 344. The outer end of push link 540 is in alignment with coin return push button 54 with spring 544 between the upper extremity of lever arm 536 and bracket 542 operating to maintain the push button 54 at the outer end of its path of travel.

The unit 532 has an escrow section 532a at the lower extremity thereof which communicates with a collection box 546 removably received in a track 548 carried by mounting plate 70. The unit 532 also communicates with a coin return chute 550 opening downwardly into the space between the opening 60 in panel 44 and bottom wall of housing 32, to permit the customer to obtain return of his change if a selection which he desires is sold out, or he changes his mind before making a purchase.

As is most apparent from FIGS. 4 and 8, an inclined ramp 552 extends between mounting plates 70 and 72 for delivering packages of cigarettes ejected from the support columns, to the forward edge of bottom wall 36 so that the customer may remove the package from housing 32. As shown in FIG. 2, a horizontal flange element 554 is mounted on the lower margin of front panel 44 defining a section of opening 60, to prevent packages of cigarettes from sliding out of housing 32 after gravitation of the same down inclined ramp 552. Change which is returned to the customer is also discharged onto flange element 554 adjacent the right margin thereof, so that the same is readily accessible to the person effecting return of the change.

Although the mechanism specifically described herein is especially adapted for operation by coins of different denominations, it is to be understood that the apparatus may be operated with various types of monetary means including paper money, checks, tokens, credit cards and other devices representing predetermined values or capable of identifying the purchaser and recording the value of articles which he selects from the machine.

*Control circuit and associated electrically operated components*

The control circuit for apparatus 30 is illustrated in FIGS. 27-A and 27-B of the drawings, with certain of the electrically operated components thereof being shown in FIGS. 22 to 26 inclusive. A pair of terminals 556 and 558 adapted to be coupled to a suitable source of electrical power were joined to electrical lead lines 560 and 562 respectively with line 560 being coupled to the switch arm 564 of 25¢ switch 566 while line 562 is joined to the coil of coin return electromagnet 568. The contact 570 of switch 566 is joined to the contact 572 of 25¢ credit hold relay 574 by a line 576. The switch arm 578 of relay 574 is also connected to line 576 by line 580. The contact 582 of relay 574 associated with switch arm 578, is connected to the switch arm 584 of 5¢, 10¢ and 25¢ switch 586 by a line 588. The normally closed contact 590 of 5¢, 10¢ and 25¢ switch 586 is coupled to the switch arm 592 of 10¢ switch 594 by a line 596, and the normally closed contact 598 of switch 594 is connected to the switch arm 600 of manual change coin payout switch 602 forming a part of changer unit 532, by a line 604. The normally closed contact 606 of switch 602 is connected to the switch arm 608 of a step-back pulse switch also forming a part of unit 532, by a line 610. The line 612 serves to join the normally closed contact 614 of the step-back pulse switch 616, to the switch arm 618 of correct price switch 434. From the normally closed contact 620 of switch 434, a line 622 leads to the switch arm 624 of lock bar switch 386 mounted on tray 344 adjacent cam member 376 for operation thereby. The normally closed contact 626 of lock bar switch 386 is connected to the switch arm 628 of coin return switch 630 located in unit 532, while the normally closed contact 632 of switch 630 is connected by line 634 directly to the coil of coin return electromagnet 568. Line 627 interconnects switch arm 628 and contact 626. The normally open contact 636 of switch 630 is connected by line 638 to the switch arm 640 of zero credit switch 642. The normally closed contact 644 of zero credit switch 642 is connected to the switch arm 646 of lock bar switch 390 on tray 344, by a line 648. The normally closed contact 650 of switch 390 is joined by line 652 to the coin return solenoid 654 forming a part of the escrow mechanism of unit 532. Line 656 connects the opposite end of the windings of electromagnet 654 to line 562.

Line 658 serves to connect the normally open contact 660 of 5¢, 10¢ and 25¢ switch 586 to the coil of credit step-up solenoid 662 forming a part of stepper assembly broadly designated 664 and illustrated in FIGS. 25 and 26. The physical construction of stepper assembly 664 will be described hereinafter.

The normally open contact 666 of 10¢ switch 594 is also connected to line 658 by lead line 668. A line 670 couples the normally open contact 672 of 25¢ switch 566 to the coil 674 of credit hold relay 574 and a line 676 connects the opposite end of coil 674 directly to the line 562.

The contact 678 of zero credit switch 642 is operably connected to the relay contact 680 of relay 574, by a line 682 while the relay switch arm 684 operably associated with contact 680, is connected by a line 686 to the contact 688 of a motor carry-over switch 690 associated with a pulse timer motor 692 mounted in housing 32 behind changer unit 532. The pulse timer motor and associated cam mechanism is illustrated in FIGS. 22 and 23 and will also be described in detail hereinafter. The switch arm 694 of switch 690 is connected directly to the field windings of motor 692 by line 696 and the line 698 connects the opposite side of the field windings to lead line 562. The normally open contact 700 of motor carry-over switch 690 is connected to lead line 560 by line 702.

The line 658 connected to step-up solenoid 662 of stepper assembly 664, is connected to the normally open contact 704 of holding relay 574 by a line 706 while the relay switch arm 708 associated with contact 704 is joined to the switch arm 710 of 5-pulse switch 712 by line 714. The contact 716 of relay 574 normally engaged by switch arm 708, is connected by line 718 to the coil of credit step-back solenoid 720 forming a part of stepper assembly 664, and a line 722 connects solenoid 720 to lead line 562. The contact 724 normally engaged by switch arm 710 of 5-pulse switch 712 is connected by line 726 to the normally open contact 728 of step-back pulse switch 616 within unit 532. The other normally open contact 730 of 5-pulse switch 712 is connected to line 686 by lead line 732. A holding switch 734 forming a part of the motor operated pulsing structure broadly designated 736 and shown in FIGS. 22 and 23 of the drawings, has a switch arm 738 in normal engagement with a contact 740, and connected by line 742 to the relay switch arm 744 of relay 574. The normally open contact 746 of relay 574 associated with switch arm 744 is joined to line 670 by a line 747. The final switch of pulsing structure 736 comprises unlatch release switch 748 having a switch arm 750 connected to line 648 by a line 752, and a normally closed contact 754 joined by line 756 to the normally closed contact 758 of sold-out relay 760. The switch arm 762 normally engaging contact 758 is connected by line 764 to the coil of unlatch solenoid 408 mounted on tray 344. Line 766 serves to join the opposite side of the coil of solenoid 408 to lead line 562.

Power for the relay 574 through holding switch 734 is furnished through line 768 joining contact 740 to the line 560 connected to terminal 556. The coil of step-up solenoid 662 is also connected to lead line 562 by a line 770.

The stepper assembly 664 includes five movable contacts 772a to 772e inclusive, which are shifted simultaneously by the armature of solenoid 662 upon successive pulsing thereof, and are movable into engagement with a series of fixed contacts 774a to 774h inclusive which are part of a printed circuit board to be hereinafter described. It is to be understood that the number of fixed contacts represented is not a definite number, but is shown to illustrate that a plurality of fixed contacts may be provided, depending upon the capacity of the machine and the amount of money that it is desired the apparatus be capable of totalizing. The price switches 474, 472, 488 and 490 associated with stepper assembly 664 have switch arms 776, 778, 780 and 782 respectively in normal engagement with corresponding contacts 784, 786, 788 and 790. Line 792 connects the normally open contact 794 of lock bar switch 386 to the switch arm 776 of switch 474, and the lines 796, 798 and 800 connect the switches 474, 472, 488 and 490 in series relationship while contact 790 is coupled to fixed contact 774h of assembly 664 by line 802.

As representative of the manner in which the pricing switch may be operably connected to stepper assembly 664, the normally open contact 804 of switch 474 is connected to contact 774a by line 806, the contact 808 of switch 472 is joined to contact 774c by a line 810, the contact 812 of switch 488 is coupled to fixed contact 774e by a line 814, and line 816 serves to join the contact 818 of switch 490 to fixed contact 774g. The movable contacts 772a to 772d inclusive are connected in parallel by lines 820 to a line 822 which leads to the relay switch arm 824 of a cancel bar relay broadly designated 826. Line 828 couples the movable contact 772e to a line 830 which leads to the relay switch arm 832 of relay 826. The normally open contact 834 associated with relay switch arm 824 is connected to the normally open contact 835 of switch 602 by line 836. The switch arm 842 of a correct change relay broadly designated 840 and normally out of engagement with a contact 838, is connected to the contact 846 of relay 826 by line 844. The coil 841 of relay 840 is interposed in a line 848 between contact 850 of coin tube sensing switch 852 and line 844. The switch arm 854 of coin tube sensing switch 852 is shiftable between the full indicating contact 850 and an empty indicating contact 856, and is connected to lead line 562 by line 858. The contact 856 is joined by a line 860 to line 560 with a correct change lamp 862. It is to be understood that the lamp 862 is located in a position adjacent the front panel 44 of housing 32, to illuminate a translucent strip carried by panel 44 adjacent coin slot 52, to indicate to the customer that correct change is required for purchase of an article from the machine because of insufficient change coins in unit 532 to make required change for a deposit exceeding the price of the article selected.

The normally closed cancel bar switches 268 and 269 have switch arms 864 and 866 respectively, with the arm 864 being coupled to line 560 by lead line 868 while the normally closed contact 870 of switch 268 is joined to switch arm 866 by line 872. The normally closed contact 890 of cancel bar relay 826 associated with switch arm 832, is connected by line 892 to the switch arm 894 of sold-out switch 222 associated with vend motor 896 forming a part of unit 196. The contact 874 of a control switch 876 ganged with switch 214 is connected to the correct price solenoid 414 mounted on tray 344, by a line 900. Line 902 serves to connect the other side of the coil of solenoid 414 to line 766 leading to line 562. Switch arm 878 of control switch 876 is joined by line 880 to the contact 882 of cancel bar relay 826. Switch arm 878 thereby moves in concert with switch arm 954 of switch 214 during operation of the vend motor 896.

The relay switch arm 906 of cancel bar relay 826 is connected to the normally open contact 908 of lock bar switch 388 on tray 344, by a line 910 while the normally open contact 912 associated with relay switch arm 906 is joined by line 914 to the coil of coin accept solenoid 916 within changer unit 532 and operably connected to the escrow section 532a. The line 918 connects the other side of solenoid 916 to lead line 562. The remaining active contact 920 of cancel bar relay 826 normally engaged by relay switch arm 878, is connected to the normally closed contact 922 of lock bar switch 388 by line 924. The coil 926 of relay 826 is connected to line 924 by a line 928 and to lead line 562 by line 930. The switch arm 932 of lock bar switch 388 is connected to line 560 by line 934.

The normally closed contact 936 engaged by switch arm 894 of sold-out switch 222, is connected by line 938 to the coil of latching solenoid 392 carried by tray 344, while the opposite side of the coil of solenoid 392 is coupled to line 766 by line 940. Line 941 between lines 900 and 940 has the coil of match solenoid 324 interposed therein. The normally open contact 942 associated with switch arm 894, is connected by a line 944 to the normally open contact 946 of sold-out relay 760. Line 948 connects switch arm 894 to the normally closed contact 950 of vend motor switch 214, with the switch arm 954 thereof being connected to the windings of motor 896 by line 956. The opposite side of the windings of the motor are connected to lead line 562 by line 958. The normally open contact 838 of correct change relay 840 is coupled by line 960 to line 892 leading to the sold-out switch 222.

The normally closed contact 961 of sold-out relay 760 associated with switch arm 962 thereof, is connected to line 944 by a lead line 964 and the switch arm 962 is coupled to the coil 966 of relay 760 by line 968. Line 970 between line 968 and lead line 562 has a sold-out lamp 972 interposed therein which is located adjacent lamp 862 for illuminating a translucent strip on the front panel 44 of housing 32, to indicate to the customer that the selection he has made is sold out and that another article should be chosen or the coin return push button 54 actuated. The normally open contact 974 associated with switch arm 962 is connected to line 742 by a line 976 while line 978 serves to connect the coil 966 to lead line 562.

The pay-out motor 980 of changer unit 532 is interposed in a line 982 between lead line 562 and line 836 with line 984 serving to couple line 982 to the normally open contact 986 of motor carry-over switch 988 associated with pay-out motor 980. The switch arm 990 of switch 988 is connected to line 604 by a line 992.

Power is furnished to the normally open contact 994 of vend motor switch 214 by line 996 leading to power line 560. Also line 998 interconnects the normally open contact 1000 of correct change switch 434 and line 638. The full-step switch 1002 has a switch arm 1004 coupled to line 638 by line 1006 and a normally open contact 1008 joined to line 682 by a lead line 1010.

The pulsing structure 736 located in a suitable box therefor behind changer unit 532, includes a bracket 1012 mounting a gear reduction unit 1014 which in turn is operably connected to and carries motor 692. The output shaft 1016 of gear unit 1014 extends through the planar section of bracket 1012 and carries an inner cam 1018 provided with a pair of opposed cam notches 1018a and 1018b therein, and an outer cam 1020 provided with two sets of four outwardly projecting cam lobes 1020a. By virtue of the raised areas on the periphery of cam 1020 at the ends of the series of cam lobes 1020a, the cam 1020 in effect presents five lobes on each 180° sector of the cam. Switches 690 and 748 are mounted on bracket 1012 on one side of the cams 1018 and 1020, while switches 734 and 712 are carried by bracket 1012 on the opposite side of the cams. The switches 690 and 748 have a common operating arm 1022 operably engaging the peripheral cam surface of cam 1018 while the switches 712 and 734 have individual operating arms 1024 and 1026 respectively which are in engagement with the outer margins of the cams 1020 and 1018 as is best shown in FIG. 23.

The stepper assembly 664 is also carried within the box receiving pulsing structure 736 and includes a main rectangular plate 1028 adapted to be secured to the wall of the protective box within housing 32, and having integral, outwardly projecting legs 1030 and 1032 which mount a printed circuit board 1034 in parallel spaced relationship to plate 1028, and a cover plate 1036 overlying board 1034 between legs 1030 and 1032. Fasteners 1038 at the corners of plate 1036 serve to secure the latter and board 1034 to legs 1030 and 1032. A toothed rotor 1040 of generally cylindrical configuration is provided with opposed, axially aligned stub shafts 1042 thereon which extend through suitable aligned apertures therefor in plate 1028, printed circuit board 1034 and cover plate 1036 for mounting rotor 1040 between the plates for free rotation relative thereto. The step-up solenoid 662 is mounted on plate 1028 on one side of rotor 1040, while the step-back solenoid 720 is carried on plate 1028 on the opposite side of the rotor. Each of the electromagnets 662 and 720 have pivotally mounted operating arms 1044 thereon which are normally maintained out of engagement with the stationary armatures 1046 of the electromagnets, by coil springs 1048 secured to one end of corresponding operating arms 1044, and suitable brackets therefor on the mounting components of solenoids 662 and 720. One circumferential section 1050 of rotor 1040 has a series of teeth in direct alignment with the operating arms 1044 of electromagnets 662 and 720, and pawl assemblies 1052 on each of the operating arms 1044 are positioned to operably engage an adjacent tooth of the section 1050 of rotor 1040, when one of the electromagnets 662 and 720 is energized to pull the operating arms thereof against the respective stationary armatures 1046. It is to be understood that the pawl assemblies 1052 are spring biased in a direction away from corresponding electromagnets 662 and 720, so that the pawls will rotate to clear an adjacent tooth of the section 1050 of rotor 1040 upon return of the operating arms 1044 to the normal disposition of the same under the influence of springs 1048.

The rotor 1040 is provided with another generally cylindrical toothed section 1054 of slightly smaller diameter than section 1050 and adapted to be engaged by a spring biased retainer member 1056 carried by bracket 1058 on plate 1028 adjacent leg 1032. Over-travel of the operating arms 1044 in a direction toward the rotor 1040 is precluded by upstanding leg segments 1060 forming a part of the mounting bracket 1062 for solenoids 662 and 720.

The zero switch 642 is carried by plate 1028 in proximity to rotor 1040 on the opposite side thereof from retainer member 1056 and having an operating arm 1064 extending toward rotor 1040 in normal underlying relationship to the section 1050 thereof, to be engaged by a pin 1066 projecting from section 1050 in eccentric relationship to the axis of rotation of rotor 1040.

The movable contact structure 772 is carried by the end of rotor 1040 adjacent printed circuit board 1034 as is clear from FIGS. 24 and 26, while the fixed contacts 774 comprise copper lines affixed to the surface of the undersurface of board 1034.

The full-step switch 1002 is carried by the bracket for solenoid 720 with the switch arm 1004 being moved away from the contact 1008 by a projection 1068 secured to the outer face of the operating arm 1044 of solenoid 720. It can therefore be seen that the switch 1002 is in a normally open condition as indicated in FIG. 27–B.

Operation

As previously noted, apparatus 30 is adapted to be operated with any type of monetary means including coins, paper money and credit cards, but for simplicity of the description, the actual mechanism shown and described is adapted to be operated with coins having a value of 5¢, 10¢ or 25¢. Accordingly, the coin accepting and changing unit 532 is shown as being adapted to receive nickels, dimes or quarters, and to return nickels as change. Therefore, as is well known in the art, the changer unit 532 has one or more vertical coin tubes therein for receiving a supply of change coins and the operating member for coin tube switch arm 854 is maintained out of the change coin receiving tube to retain the switch arm in engagement with contact 850 indicating sufficient change coins in the tube therefor to make change for the highest possible difference between coins that are totalized by the machine and the price of a product purchased by the customer.

Loading of package columns

In loading apparatus 30 with packages to be vended such as cigarettes, the front panel 44, which is normally locked to prevent theft of packages, is swung open to expose the front article receiving columns and the match booklet dispensing mechanism. Before loading the front and rear columns, the operator must swing the front package columns outwardly about the axes of hinge pins 126. The article ejecting mechanisms 144 and 146 are in the stand-by disposition of the same as best shown in FIG. 4, and the column advancing members 80 of all rear columns that have been exhausted of cigarette packages in the front stacks thereof will be in a forward position. The operator refills the stacks to the top thereof and then shifts the members 80 and cigarette packages therein rearwardly with the rivets 82 being shifted into segments 84a of corresponding slots 84 in the planar sections of panels 64. The packages of cigarettes in members 80 thereby rest on leg portion 68b of member 68 with the segments 98 being forced downwardly to shift the projections of levers 90 upwardly through respective slots 94 therefor in member 68. The lower, downturned lugs 86 of members 80 are located behind projections 88 of lever members 90 to maintain the rear extremities of members 80 against the upright rear segments of panels 64, against the action of leaf springs 100. The vertical columns of packages directly in front of the members 80 are then filled to the top with the lowermost packages of these columns resting on the support members 76 carried by the lower extremities of panels 64. Thus, two vertical columns of cigarettes are provided in the space between each adjacent pair of panels 64.

While the front column structure is still in the open position thereof the operator has access to the rear upright openings in the front column supports so that the space between adjacent panels 128 may be completely filled with packages of cigarettes disposed in vertically stacked relationship and with the lowermost article of corresponding stacks supported by members 140 carried by the lower extremities of panels 128. Thus, the rear columns are loaded from the front thereof, while the front cigarette receiving columns defined by panels 128, are loaded from the rear of the swingable front column structure while the same is swung out of housing 32.

Next, the front column structure is returned to its normal nested disposition within housing 32 whereupon the latch member 250 reengages with the lug 252 on plate member 72 to releasably retain the front column structure in proper disposition overlying the ejecting mechanism 144.

The match booklet columns defined by elements 132 are filled with vertical stacks of booklets which rest on the support members 142 at the lower extremities of elements 132.

The operator then determines if the correct brand strips are provided in the selector buttons 50 corresponding to the types of cigarettes in the various columns of the machine defined by panels 64 and 128. As previously explained, the brand strips may be readily changed in the selector buttons 50 by simply removing the latter from panel 44 and slipping the strip therein out of notches 520 followed by replacement of the strip with a correct brand designation. Removal of the individual selector buttons 50 is effected by simply grasping the lower margins of the same and pulling the same rearwardly until the upper sections of side walls 508 can be removed from the elongated slot 524 in upper casting 498. Replacement of the selector buttons is effected in the same manner and the front panel 44 may now be closed and relocked, assuming that the coin tubes of coin accepting and changing mechanism 532 are filled with a suitable number of change coins. It is to be understood in this respect that the unit 532 is of the type that causes nickels deposited in apparatus 30 to be directed into the change coin tubes to refill the same, and therefore maintain the change coin tubes in a full condition at all times for maintaining operation of the machine in a "Use Correct Change Only" condition at a minimum.

Vend cycle including return of change

The stepper assembly 664 as illustrated is adapted to total the value of coins deposited in coin slot 52 up to a value of one dollar in nickel increments. Also, changer unit 532 is designed to refund up to four nickels change when the predeposit in apparatus 30 exceeds the price of the selection made. Therefore, since most packages of cigarettes, for example, vended from automatic apparatus, are sold at a price of 30¢ or 35¢, the customer can deposit two quarters in the machine and obtain refund of three or four nickels depending upon the price of the cigarettes purchased. Similarly, a quarter and a dime can be deposited and a nickel change obtained if a 30¢ package is selected by the customer.

However, in order to simplify the present description, it will be assumed that all of the articles in the support structures are priced at either 25¢ or 15¢ thereby requiring return of two change coins to a customer if he selects a 15¢ article after deposit of a quarter. Thus, the stationary contacts 774a, 774b, 774c, 774d and 774e respectively represent 5¢ to 25¢ in nickel increments.

If the customer desires to purchase a 15¢ article from apparatus 30, but does not have correct change and deposits a quarter in the coin slot 52, the coin gravitates downwardly through the coin chute 534 into the rejector assembly at the top of unit 532 whereby such coin is tested for authenticity and directed into a proper coin channel according to the denomination of the coin. It is to be understood that blocking members controlled by the coin return electromagnet 568 are maintained out of the path of travel of the quarter downwardly through the rejecting unit, inasmuch as the terminals 556 and 558 are connected to a power line resulting in energization of the coil of electromagnet 568 through a path including terminal 556, line 560, switch arm 564, contact 570, line 576, line 580, switch arm 578, contact 582 line 588, switch arm 584, contact 590, line 596, switch arm 592, contact 598, line 604, switch arm 600, contact 606, line 610, switch arm 608, contact 614, line 612, switch arm 618, contact 620, line 622, switch arm 624, contact 626, line 627, switch arm 628 of coin return switch 630, contact 632, line 634, the coil of electromagnet 568 and lead line 562 coupled to terminal 558. The coin return electromagnet serves to prevent coins passing into escrow structure of unit 532 if the line cord of apparatus 30 is disconnected from the power source. Also, as will become apparent, the coin return electromagnet is deenergized to prevent introduction of additional coins into unit 532 during a vend cycle. When the fingers controlled by coin return electromagnet 568 are in the path of coins through the rejecting and accepting section of unit 532, the coins are diverted into the coin return chute 550 so that the customer may obtain the coins through opening 60 in front panel 44.

After leaving the coin acceptor and rejector at the upper end of unit 532, the quarter initially contacts the switch arm 584 of nickel, dime and quarter switch 586 and shifts the arm into engagement with contact 660 to pulse the credit step-up solenoid 662 through a circuit comprising terminal 556, line 560, switch arm 564, contact 570, line 576, line 580, switch arm 578, contact 582, line 588, switch arm 584, contact 660, line 658, the coil of electromagnet 662 and line 770 connected directly to the lead line 562 joined to terminal 558. Upon energization of the electromagnet 662, the operating arm 1044 thereof is attracted to the stationary armature 1046 against the action of coil spring 1048, to cause the pawl assembly 1052 associated therewith to engage a proximal tooth of section 1050 of rotor 1040 and rotate the latter in a counterclockwise direction viewing FIG. 24. It is to be understood that the movable contacts 772a, 772b, 772c, 772d and 772e are initially in the position of the same shown in FIG. 26 with respect to the circuits of board 1034 and therefore, the first energization of electromagnet 662 causes the movable contact 772e to be moved into engagement with the fixed contact 774a establishing a nickel increment of advancement of the assembly 664. The quarter maintains the switch arm 584 in engagement with contact 660 for only an instant, and therefore upon deenergization of the electromagnet 662, the operating arm 1044 thereof is returned to the normal location of the same as shown in FIG. 24 whereby the pawl assembly 1052 thereon clears the next adjacent tooth of section 1050 of rotor 1040 thereby permitting stepping of rotor 1040 another increment upon energization of the electromagnet 662. Thus, during each energization of credit step-on solenoid 662, the five contacts 772a, 772b, 772c, 772d and 772e are moved one step with respect to the fixed contacts 774a, 774b, 774c, 774d, 774e, 774f, 774g and 774h.

The quarter during its gravitational movement downwardly through the changer unit 532 next engages the switch arm 564 of 25¢ switch 566 to shift the switch arm into engagement with contact 672 to effect energization of the credit hold relay 574 from line 560 through switch arm 564, contact 672, line 670, the coil 674 of relay 574 and line 676 connected to lead line 562 joined to the power terminal 558. Energization of relay 574 shifts the relay switch arms 578, 684, 708 and 744 downwardly in FIG. 27 whereby a holding circuit for relay 574 is established from line 560 through holding switch 734 including line 768 coupled to line 560, contact 740, switch arm 738, line 742, relay switch arm 744, contact 746, line 747, line 670, coil 674, line 676 and lead line 562. Therefore the coil 674 will remain in an energized condition so long as the holding switch 734 is closed. Energization of relay 574 also causes the pulse timer motor 692 to be actuated from line 560 via switch arm 564, contact 570, line 576, contact 572, switch arm 684, line 686, contact 688, motor carry-over switch arm 694, line 696, the field windings of motor 692, line 698 and lead line 562 connected to terminal 558. Upon energization of the motor 692, the output shaft 1016 of gear unit 1014 is rotated to move the cams 1018 and 1020 from the stand-by locations of the same as shown in FIG. 22, whereby the operating arm 1022 is caused to move to the outer periphery of cam 1018 thereby shifting switch arm 750 of unlatch release switch 748 out of engagement with contact 754 and also moving switch arm 694 of motor carry-over switch 690 into engagement with contact 700. It is apparent that engagement of switch arm 694 with contact 700 couples the field windings of motor 692 directly to the power lines 560 and 562 whereby motor 692 will continue to operate until switch 690 reopens.

During rotation of the cam 1020 on shaft 1016, the operating arm 1026 of holding switch 734 continues to ride along the outer margin of cam 1018 to maintain the switch arm 738 in engagement with contact 740 whereby the relay 574 remains energized until the operating arm 1026 can move into a notch 1018a in cam 1018. As is apparent from FIG. 22, the operating arms of the switches on opposite sides of cams 1018 and 1020 are not located in 180° spaced relationship, around the circumferences of cams 1018 and 1020, so that the holding circuit for relay 574 will be discontinued when the switch arm 738 shifts out of engagement with contact 740, but operating arm 1026 will again return to the outer cam margin of cam 1018 before motor 692 is deenergized. However, the relay 574 is not reenergized upon reestablishment of the holding circuit through switch 734, because the switch arm 744 will have moved out of engagement with contact 746 upon deenergization of coil 674.

Returning to the description of the rotation of cams 1018 and 1020, it can be seen that the operating arm 1024 of switch 712 will successively move into the notches 1020a of cam 1020 to cause the switch arm 710 to engage contact 730 five successive times thereby resulting in pulsing of the electromagnet 662 the first four times that switch arm 710 engages contact 730 through the circuit from line 560 and closed switch 566 via line 576, contact 572, switch arm 684 of relay 574, line 686, line 732, contact 730, pulse switch arm 710, relay switch arm 708, contact 704, line 706, line 658, coil 662, line 770 and power lead line 562. The fifth time that switch arm 710 engages contact 730 solenoid 662 is not energized because as is clear in FIG. 22, the operating arm 1026 of holding switch 734 is permitted to move into a notch 1018a before the operating arm 1024 moves into the last notch 1020a, discontinuing the holding circuit for relay 574.

As the electromagnet 662 is being pulsed by structure 736, the quarter has moved downwardly in unit 532 and comes to rest in the escrow section 532a. The movable contacts 772a to 772e inclusive have now been stepped to a point with the contact 772e in engagement with the right-hand contact 774e of the fixed contacts 774 on printed circuit board 1034 thereby permitting the customer to purchase a 25¢ item or a 15¢ item, since the coin storage tube of unit 532 contains sufficient nickels for return of change as indicated by engagement of the switch arm 854 of coin tube sensing switch 852 with contact 850. It is also important to note at this juncture that the cancel bar relay is in an energized condition because of its parallel connection to lines 560 and 562 along with coin return electromagnet 568. The switch arms of cancel bar relay 826 are shown in the normal disposition of the same when the relay is energized through a path from line 560 including line 934, switch arm 932 of lock bar switch 388, contact 922, line 924, coil 926 of relay 826, line 930 and power lead line 562 connected to terminal 558. Another holding circuit path for relay 826 extends from line 560 through line 868, the series connected switches 268 and 269, line 876, relay switch arm 878, contact 920 and line 924 joined to line 928.

The customer may now select either a 15¢ or 25¢ item from apparatus 30, and therefore the manner in which pricing switches 472, 474, 488 and 490 are connected to fixed contacts 774 determines the relative price value between the contacts 774a to 774h inclusive. For purposes of illustration only, it may be assumed that the switch 474 is connected to a contact representing a price of 5¢, the switch 472 is set up for vending at 15¢, the switch 490 at 25¢ and the switch 488 at 35¢. A fifth price of 40¢ can be obtained as indicated by the line 802 coupled to fixed contact 774h, by inverting selected pricing elements 456 so that the pins 456b thereof are not located in one of the apertures 452a to 452d inclusive, whereby shifting of the connector element 356 associated therewith does not result in sliding of one of the pricing members 458 or 460 transversely of element 356. As the apparatus is illustrated in FIG. 5 and schematically represented in FIGS. 27-A and 27-B, the push rod 350″ operably joined to connector element 356″ is conditioned to effect vending of an article at 15¢ because the pricing element 456 thereon is positioned to effect shifting of member 458 in a direction to actuate pricing switch 472 upon inward movement of the push rod 350″. Thus, the customer pushes inwardly on the second button 50 from the right viewing the front panel 44 of apparatus 30, whereby the boss 512 thereof engages the head 354 of push rod 350″ to shift the latter inwardly against the action of the respective coil spring 352. As the push rod 350″ is moved inwardly or toward the rear of the housing 32 viewing FIG. 5, the element 356″ connected thereto is likewise shifted inwardly to cause the wedge 362 thereon to separate the adjacent captive links 360 and thereby preclude simultaneous or successive operation of any other push buttons 50 on the front panel 44 of the housing 30. Also, during inward movement of the connector element 356″, the ear sections 372 thereon engage the rear leg 370b of member 370 to rotate the latter in a counterclockwise direction as shown in FIG. 6 whereby the leg 370a moves downwardly into the notches of the remaining ears 372 of the other connector elements 356 and serving as additional means to prevent operation of more than one selector button 50 at a time. The front leg 370a of member 370 moves in front of the foremost edges of the ear sections 372 of the actuated connector element 356″ to thereby maintain the push rod 350″ and the connector element 356″ connected thereto, in the actuated position of the same as shown in FIG. 5, until after the completion of the vend cycle. The operation of the structure for maintaining the members 370 in the rotated position of the same will be described after the description of the operation of the pricing switch 472 is completed.

As the connector element 356″ shifts inwardly under the influence of push rod 350″, the pin 456b of the pricing element 456 mounted on connector element 356″, and located in the aperture 452c of the section 356c of connector element 356″, engages the cam surface 462b of a notch 462 in member 458 aligned with the pin 456b, whereby the member 458 is cammed to the right of housing 32 through a path of travel to cause the pin 456b on member 458 to engage the adjacent arm section of actuator 468 and thereby pivot the latter about the axis of pin 478 and against the action of coil spring 480, to cause the actuator to permit the contacts of switch 472 to change. Thus, the switch arm 778 is shifted into engagement with contact 808 thereby completing a circuit to the vend motor 896.

However, before setting forth the complete circuit for motor 896, the operation of the structure for maintaining member 370 in the actuated condition thereof should be understood because these components have a bearing on the operation of the vend mechanism. When the shaft 364 is rotated by the member 370, the cam member 376 is rotated therewith in a counterclockwise direction as shown in FIG. 7, by the clutch spring interconnecting clutch member 374 on shaft 364, and the cam member 376. During rotation of the cam member 376 to the disposition of the same illustrated in FIG. 7, and against the action of spring 381, the cam surface 376a of member 376 engages the actuating arm 382 to effect shifting of the switch arm 624 of lock bar switch 386 into engagement with contact 794, the switch arm 932 of lock bar switch 388 into engagement with contact 908, and the switch arm 646 of lock bar switch 390 out of engagement with contact 650. With the lock bar switch 390 in an open condition, it is impossible for the coin return solenoid 654 of the escrow mechanism of unit 532 to be actuated. When the switch arm 778 of pricing switch 474 has been moved into engagement with contact 808 as previously set forth, a circuit is completed to the correct change relay as soon as the switch arm 624 of lock bar switch 386 is moved into engagement with contact 794, through a circuit traced from line 560 through switch arm 564 of 25¢ switch 566, contact 570, line 576, line 580, switch arm 578 of relay 574, contact 582, line 588, switch arm 584 of switch 586, contact 590, line 596, switch arm 592 of switch 594, contact 598, line 604, switch arm 600 of switch 602, line 610, switch arm 608 of switch 616, contact 614, line 612, switch arm 618 of switch 434, contact 620, line 622, switch arm 624, contact 794, line 792, switch arm 776, contact 784, line 796, switch arm 778, contact 808, line 810, line 822, switch arm 824 of cancel bar relay 826, contact 846, line 844, line 848, coil 841 of correct change relay 840, contact 850 of coin tube sensing switch 852, line 858, and power lead line 562 coupled to terminal 558. Thus, changing of the contacts of lock bar switch 386 effects energization of the latching solenoid 392 from the correct change relay 840 through the path previously traced and in parallel with coil 841 through relay switch arm 842, contact 838, line 960, switch arm 894 of sold-out switch 222, contact 936, line 938, the coil of solenoid 392, line 940 and line 766 connected to power lead line 562. Energization of the latching solenoid 392 causes the armature 410 thereof to be retracted thus assuring positive movement of the cam member 376 into the actuated position of the same as shown in FIG. 7 by virtue of the link connecting cam member 376 to armature 410. The slide plate 398 moves under the face 376b of cam member 376 as soon as the latter has rotated through the full path of travel thereof, by virtue of spring 402 biasing slide plate 398 forwardly into the disposition of the same best shown in FIG. 7. In this manner, the slide plate 398 absolutely precludes return rotation of cam member 376 thereby locking the member 370 against return rotation and maintaining the connector element 356″ and the push rod 350″ in the actuated positions of the same illustrated in FIG. 5.

Notwithstanding movement of switch arm 932 of lock bar switch 388 into engagement with contact 908 thereby breaking one path of travel for energization of cancel bar relay 826, the coil 926 thereof remains energized through the parallel path previously described through cancel bar switches 268 and 269.

The vend motor is energized through line 822, switch arm 824 of relay 826, contact 846, line 844, correct change relay switch arm 842, contact 838, line 960, line 948, contact 950, switch arm 954 of vend motor switch 214, line 958 having motor 896 therein, and power lead line 562.

Before describing in detail the manner in which vend motor 896 drives the ejector mechanisms 144 and 146 through article ejecting paths of travel, it is to be pointed out that when the customer actuates the push button 50 to move push rod 350″ and connector element 356″ inwardly to the disposition shown in FIG. 5, the connector link 444 connected to element 356″ is moved rearwardly as depicted in FIG. 6 whereby the connector 448 is rocked about the axis of shaft 446 effecting depression of rod 230 aligned with pusher rod 350″ and connector element 356″, by virtue of the downward shifting of the pusher 450 which engages and then depressed the rod 230 associated therewith into a location as shown in FIG. 10. Thus, the cam element 234 on the depressed rear rod 230 is moved into a position beneath the support members 76 of an article column defined by adjacent spacer panels 64 on opposite sides of the shifted rod 230, so that one of the pusher fingers 172 may be shifted into an article ejecting location while the remaining pusher fingers 172 of mechanisms 144 and 146 are movable along paths of travel below the support members 76 and 140 of the article receiving columns.

Therefore, upon initial operation of the vend motor 896, the output shaft of gear unit 196 is rotated in a counterclockwise direction viewing FIG. 2, causing the crank arm 198 thereon to be rotated in the same direction and moving link 200 upwardly to rock connector plate 202 about the axis of torsion shaft 112. Since the shaft 112 extends the full width of the article columns, the link 210 secured to the torsion member 112 is oscillated therewith whereby the plate 202 and link 210 initially swing toward the rear wall 42 of housing 32 thereby shifting plates 160 and 162 in a direction toward the rear segments of the mounting plates 70 and 72. During such rearward movement of plates 160 and 162, the same move along a rectilinear path defined by parallel guide slots 148 and 150, thus causing the ejector mechanisms 144 and 146 connected to plates 160 and 162, to be moved therewith. Upon engagement of the pusher finger 172 of ejector mechanism 146 with the depressed cam element 234 as illustrated in FIG. 10, the cam face 182 of the ejector finger 172 rides up the arcuate upper surface of cam element 234 to move the cross head 180 of the finger 172 into article ejecting disposition above the planar upper faces of the proximal support members 76. The remaining pusher fingers 172 of mechanisms 144 and 146 remain below the levels of support members 76 and 140, inasmuch as only one cam element 234 can be moved at a time into camming disposition with respect to the adjacent pusher fingers 172. As soon as the crank arm 198 has reached the upper end of its path of travel and commences downward rotation about the axis of output shaft of the gear assembly within unit 196, the link 200 is shifted downwardly to rock plate 202, torsion shaft 112 and link 210 toward the front area of housing 32 whereby the links 206 and 212 shift plates 160 and 162 forwardly to move the ejector mechanisms 144 and 146 therewith. As the ejector mechanism 146 is shifted in a forward direction, the pusher finger 172 shifted into article ejecting disposition as shown in FIG. 10, comes to rest on the upper faces of the support members 76 aligned therewith and the lowermost article of the column aligned with the raised pusher finger 172 is shoved forwardly along the support members 76 engaged thereby. Forward movement of the article by the cross head 180 of the raised pusher finger 172 causes the front face thereof to engage the rear cancel bar 262 and pivot the same about the axis of the rod 256 carrying the same. Pivoting motion of the rear cancel bar causes the cam mounted thereon to change the contacts of switch 269 whereby the switch arm 866 is moved into engagement with contact 886 thereby breaking the circuit to cancel bar relay 826.

The article being ejected is supported by the element 192 projecting forwardly from the bar 152 of ejector mechanism 146 until the latter reaches the forwardmost end of its path of travel and commences return movement during completion of the cycle of operation of vend motor 896. As the mechanisms 144 and 146 are moved rearwardly by links 206 and 212 connected to rocker plate 202 and link 210, the rear cancel bar 262 in an upright disposition engages the rearmost upright face of the cigarette package and causes the same to be dislodged from the rear element 192 for gravitation onto the inclined ramp 552 for movement downwardly into engagement with the flange element 554 of front panel 44. The customer may thereby obtain the package by simply reaching into housing 32 through the opening 60. The mechanisms 144 and 146 continue rearwardly until the projection 221 engages extension 218 of operating arm 216 to shift the switch arm 954 of vend motor control switch 214 out of engagement with contact 994. As the mechanisms 144 and 146 are shifted rearwardly, all of the push fingers 172 will be located below the support members 76 and 140 because as soon as the cross head 180 of the raised pusher finger 172 clears the support member 76 engaged thereby, the pusher finger 172 rotates about the axis of the respective rod 170 into the lower position of the same as shown in FIG. 4. In order to assure return of the pusher fingers 172 that have been moved to article ejecting positions, into the normal locations thereof, the return bar 184 of each mechanism 144 and 146 is rocked about the axis of rotation thereof in a clockwise direction as shown in FIG. 4, to cam any pusher finger 172 that tends to stick in its upper position, downwardly and thereby positively assure return of the pusher fingers to their unoperated locations. Camming of the return bars 184 in a clockwise direction is effected by engagement of the cam legs 186 on return bars 184 with cam stops 188 as previously described. The rearwardly extending finger segments 191 on return bars 184 also operate to push the rear extremities of the packages of cigarettes being ejected, upwardly upon return of the bars 184 to the original disposition of the same, to assure that the packages are not caught below respective cancel bars 262 which could cause the customer to lose his deposit without obtaining a product.

Upon commencement of operation of the vend motor 896, the cam projection 221 on link 200 moves out of engagement with the extension 218 of operating arm 216 and thereby permitting the switch arm 954 to move into engagement with contact 994 whereby the vend motor is interposed directly in a circuit from terminals 556 and 558 including line 560, line 996, contact 994, switch arm 954, line 958 and power lead line 562. Therefore, even though the circuit to vend motor 896 through cancel bar relay 926 is broken, the vend motor will continue to operate until the extension 218 again contacts projection 221 to shift operating arm 216 in a direction to move the switch arm 954 out of engagement with contact 994.

It is also significant to note that the power is initially applied to vend motor 896 through the correct change relay 840 which is permitted to be energized only if the coin sensing switch arm 854 is in engagement with contact 850 indicating that a sufficient number of coins are present in the coin tube of changer unit 532 to permit return of change coins to the customer upon selection of a product at a lower price than the deposit made in the machine.

Deactivation of cancel bar relay 826 causes the switch arm 824 thereof to shift into engagement with contact 834 thereby effecting operation of the changer pay-out motor 980 from line 822 through switch arm 824, contact 834, line 836, line 982 and line 562. The motor 980 is operably coupled to a rotatable or reciprocable side plate located below the change coin storage tubes for discharging nickels successively therefrom as the plate is moved by the motor. As soon as the motor 980 commences to rotate the pay-out slide plate, a cam on the motor shaft or suitably operated thereby, shifts the switch arm 990 of motor carry-over switch 988 into engagement with contact 986 whereby the motor 980 may be powered from the line 604 through the circuit previously traced to continue operation of the motor 980 until switch arm 990 is shifted out of engagement with contact 986. The switch arm 608 of step-back pulse switch 616 is also shifted out of engagement with the contact 614 and into engagement with the contact 728 upon commencement of operation of motor 980, to effect energization of the step-back electromagnet 720 through a circuit from line 604 through switch arm 600, contact 606, switch arm 608, contact 728, line 726, contact 724, switch arm 710, line 714, switch arm 708, contact 716, line 718, the coil of electromagnet 720, line 722 and power lead line 562, Activation of electromagnet 720 causes the operating arm 1044 thereof to be attracted toward the fixed armature 1046 associated therewith, whereby the pawl assembly 1052 of solenoid 720 is shifted into engagement with an adjacent tooth of the section 1050 of rotor 1040 to step the latter backwardly one increment from its initial travel, thereby moving all of the contacts 772a to 772e inclusive one step to the left, viewing FIG. 27–B, whereby the contact 772e is shifted into engagement with the contact 774d. The changer unit 532 ejects one nickel therefrom during the period of operation of motor 980 with the switch arm 990 in engagement with contact 986, and with the nickel passing into the coin return chute 550 for gravitation to the lower area of housing 32 where the coin is accessible to the customer through the opening 60.

However, the motor 980 continues to be energized because of the movement of the contact 772d into engagement with contact 774c whereby power is applied to line 822 from line 792 effecting energization of motor 980 through the relay switch arm 824 of relay 826 along a path previously traced. In this manner, the changer will go through another cycle of operation to discharge a second change tube coin to the customer and with the step-back pulse switch 616 again being actuated to energize electromagnet 720 to step the rotor 1040 back one increment and thereby move the contacts 772a to 772e inclusive one step to the left as shown in FIG. 27–B, whereby the contact 772e is in engagement with contact 774c while contact 772d is in engagement with fixed contact 774b. The circuit to changer motor 980 is thereby permanently interrupted and the latter will cease operation as soon as the switch arm 990 is moved out of engagement with contact 986.

Movement of the contact 772e into engagement with contact 774c permits energization of the correct price solenoid 414 mounted on tray 344 as soon as the vend motor 896 has completed a full cycle of operation with the switch arm 878 of switch 876 returning to the normal condition thereof. The energizing circuit for solenoid 414 may be traced from line 792 through switches 472 and 474, line 830, relay switch arm 832, contact 882, line 880, switch arm 878, contact 874, line 900, the coil of solenoid 414 and line 902 connected directly to line 766 leading to power line 562. Operation of solenoid 414 causes the armature 416 thereof to be retracted into the body of the solenoid whereby the slide element 420 is shifted forwardly to move the flange 422 into engagement with control plate 424 and slide the latter forwardly along the rectilinear path defined by aligned slots 426 in tray 344. As the control plate 424 moves forwardly, the spring retainer 430 shifts out of notch 424a and into the notch 424b while the actuating arm 432 of switch 434 moves off of the cam surface 424d onto the margin of surface 424e. In this manner, the switch arm 618 of correct price switch 434 shifts into engagement with the contact 1000 thereby breaking the circuit to correct price solenoid 414 and effecting de-energization of the latter. However, switch 434 is mechanically locked in the actuated condition thereof by plate 424.

As is apparent from FIG. 24, when the rotor 1040 is rotated in a counterclockwise direction by the step-up solenoid 662, the pin 1066 is shifted in a direction to permit the operating arm 1064 of zero switch 642 to swing in a direction whereby the internal switch arm 640 moves out of engagement with contact 644 and into engagement with contact 678. Therefore, upon shifting of switch arm 618 into engagement with contact 1000, the pulse timer motor 692 is actuated through a circuit traced from power line 560 through switch arm 564, contact 570, line 576, line 580, switch arm 578 of relay 574, contact 582, line 588, switch arm 584, contact 590, line 596, switch arm 592, contact 598, line 604, switch arm 600, contact 606, line 610, switch arm 608, contact 614, line 612, switch arm 618, contact 1000, line 998, line 638, switch arm 640, contact 678, line 682, contact 680, switch arm 684, line 686, contact 688, switch arm 694, line 696, the windings of motor 692, line 698, and power lead line 562. Upon operation of the pulse timer motor 692, the switch arms 750 and 694 of switches 748 and 690 are immediately shifted to establish a holding circuit for the motor 692 through switch 690 as previously explained and which is maintained until the operating arm 1022 is permitted to move into another notch 1018b in cam 1018. The holding switch arm 738 is moved out of engagement with contact 740 and held in an open condition, while the operating arm 1026 moves downwardly into the successive notches 1020b in cam 1020 during rotation of the latter to cause the switch arm 710 to successively engage the contact 730 to pulse the step-back solenoid 720 through the circuit from line 686 via line 732, contact 730, switch arm 710, line 714, switch arm 708, contact 716, line 718, the coil of electromagnet 720, line 722 and lead line 562. As the solenoid 720 is actuated, the pawl assembly 1052 associated therewith engages the proximal teeth of section 1050 of rotor 1040 to rotate the latter in a clockwise direction and thereby shift the movable contacts 772 toward their initial dispositions as shown in FIG. 26. The rotor 1040 will thereby be returned to the stand-by position of the same because of pulsing of solenoid 720 five times as the operating arm 1026 moves into the five notches 1020b in the periphery of cam 1020. Five effective pulses are obtained from switch 712 in this operation of stepper assembly 664, because during the fifth movement of operating arm 1044 of solenoid 720 toward the fixed armature 1046, the switch arm 1004 swings toward the contact 1008 to close switch 1002 whereby power is applied to motor 692 even though zero switch 642 returns to the normal condition thereof as the operating arm 1064 is swung to its stand-by location by the pin 1066 on rotor 1040. Thus, operation of the pulse timer motor 692 through a full cycle is assured even though switch 734 opens because of the circuit established to step-back solenoid 720 through the full-step switch 1002. Movement of the operating arm 1022 of switches 690 and 748 into the next notch in cam 1018, causes the switch arm 750 to return to engagement with contact 754 and thereby effecting actuation of solenoid 408 at the time of discontinuance of operation of the pulse timer structure 736. The energization path for solenoid 408 can be traced from line 622 through switch arm 618, contact 1000, line 998, line 638, switch arm 640, contact 644, line 648, line 752, switch arm 750, contact 754, line 756, contact 758, relay switch arm 762, line 764, the coil of solenoid 408, line 766 and power lead line 562. Actuation of solenoid 408 causes the armature 410 thereof to be retracted, thus shifting slide plate 398 rearwardly to move the control plate 424 into the location of the same as shown in FIG. 5, whereby the switch arm 618 of correct price switch 434 is returned to its position in engagement with contact 620 and breaking the circuit to the coil of relay 408. Movement of the slide plate 398 rearwardly also permits the cam member 376 to rotate in a clockwise direction as shown in FIG. 7 under the influence of spring 381, whereby the shaft 364 and member 370 carried thereby, rotate in a direction to release and permit the actuated push rod 350″ to return to the original outer position thereof. The lock bar switches 386, 388 and 390 return to the normal stand-by condition thereof as illustrated in FIG. 27–A, whereby the coin return electromagnet 568 is reenergized through the lock bar switch 386, the cancel bar relay 826 is reenergized through lock bar switch 388, and the coin return solenoid 654 is placed in condition for actuation by the customer through lock bar switch 390 and upon manual operation of coin return switch 630 as will be explained.

Deenergization of the cancel bar relay 826 and return of switch 388 results in energization of the coin accept solenoid 916 from line 560 through a path including line 934, switch arm 932 of lock bar switch 388, contact 908, line 910, relay switch arm 906, contact 912, line 914, the coil of solenoid 916, line 918 and power lead line 562. The coins held in escrow in changer unit 532 are thereby released for gravitation into the coin collection box 546.

During actuation of the ejector mechanisms 144 and 146 by rotation of the torsion shaft 112 through the connector plate 202 joined to link 200, the plate 114 on shaft 112 clears all of the legs 108b of operating members 108 since the legs 108a thereof are maintained in an upright disposition because of the packages of cigarettes located in the forwardmost portions of the spaces between panels 64.

However, if the packages of cigarettes in a column forwardly of the leg section 68b of plate member 68 are depleted to an extent to permit the operating member leg 108a to swing outwardly into the disposition of the same illustrated in FIG. 4 under the influence of the counterweight section 108b, during the next cycle of operation of the vend mechanism, the plate 114 is moved into engagement with the depending leg section 108b of the operating member 108 that has moved to the location as shown in FIG. 4 whereby the connector links 102 are caused to pivot about the axis of cross shaft 92 to move the projection 88 out of engagement with the lug 86 on the aligned column advancing member 80, whereby the latter is permitted to swing about the axis of the rivet 82 securing the same to a panel 64 whereby the column of cigarette packages in member 80 are then positioned to gravitate into the forwardmost area of the rear column supports to supply an additional number of packages for dispensing by the mechanism 146. The lowermost cigarette packages in the shifted member 80 thereby move the leg 108a of the operating member 108 aligned therewith, back to the initial position of the same so that the section 108b thereof is out of the path of travel of plate 114 on shaft 112 during oscillation of the latter as another article ejecting cycle is effected.

The column advancing members 80 are shiftable along the guide slots 84 to a forward position between opposed panels 64 so that only one column of cigarettes may be placed in the back section of apparatus 30, if it is not desired that two back-to-back columns be provided for a particular brand.

*Dispensing of match booklets*

It is initially assumed that the machine is set up to dispense a booklet of matches each time a package of cigarettes is discharged from one of the support columns. It is important to note however, that a booklet of matches is not dispensed until after a cancel bar switch has been operated confirming delivery of a package of cigarettes from the machine.

During forward movement of the plates 160 and 162 by the connector plate 202 operably coupled to the motor and gear box unit 196, the lug 306 on plate 160 engages the screw 304 on component 300 to swing the latter in a clockwise direction as shown in FIG. 2 about the axis of pin 302. When the cam surface 300a of component 300 engages the flange 292b of latch and cam member 292, the latter is swung upwardly about the axis of pin 293 to cause the lock tab 292c thereof to shift the retainer element 328 operably coupled to solenoid armature 326, upwardly until the element 328 clears lock tab 292c whereby spring 332 again pulls the retainer element 328 downwardly to the normal disposition of the same illustrated in FIG. 4. During swinging movement of the latch and cam member 292, the pin 296 on pawl 294, biased toward the outer periphery of ratchet wheel 284 by spring 298 between pawl 294 and flange 292b, rides along a proximal arcuate surface 284c of ratchet wheel 284 and finally passes over one of the shoulders 284b and then commences to ride up another arcuate surface 284c.

At this time, the plates 160 and 162 cease forward movement and commence to move rearwardly as the crank arm 198 shifts over center, whereby the lug 306 then permits the component 300 to return to its initial position under the influence of gravity. The leg 308b of coil spring 308 biases member 292 in a counterclockwise direction until the lock tab portion 292c thereof engages the retainer element 328 on solenoid 324. The pin 296 on pawl 294 will thereby be in engagement with one of the arcuate surfaces 284c of ratchet wheel 284, and will be slightly spaced from one of the shoulders 284b.

During sliding movement of the pin 296 on pawl 294 along the periphery of ratchet wheel 284, the latter is precluded from rotating in a clockwise direction by the anti-backup element 290 engaging one of the shoulders 284b as shown in FIG. 4.

During return movement of the article ejecting mechanisms 144 and 146, the cam projection 221 on link 200 engages the extension 218 to return switches 214 and 876 to the normal condition thereof as shown in FIG. 27–B, whereby the match solenoid 324 is energized through a path from line 622 including switch arm 624 of lock bar switch 386, contact 794, line 792, switch arm 776 of switch 474, contact 784, line 796, switch arm 778 of switch 472, contact 808, line 810, contact 774c, contact 772e, line 828, line 830, relay switch arm 832, contact 882, line 880, switch arm 878 of switch 876, contact 874, line 900, line 941, the coil of solenoid 324, line 940, line 766 and power lead line 562. Actuation of solenoid 324 effects retraction of the armature 326 whereby the retainer element 328 is shifted vertically to a disposition clearing the lock extension 292c of latch and cam member 292 and the latter is free to pivot about the axis of pin 293 under the influence of spring 308. The member 292 thereby drives the ratchet wheel 284 through a 45° arc under the influence of spring 308. During rotation of ratchet wheel 284 through an arc of about 45°, the shaft 278 is rotated therewith to effect ejection of one booklet of matches from a column defined by an element 132 with the front retainer spring 138 aligned therewith permitting only one booklet of matches to be dispensed at a time. Inasmuch as the ejectors 288 on shaft 278 are arranged in spiral disposition along the length of shaft 278, booklets of matches will be dispensed successively from elements 132 from one end of the series of columns to the opposite extremity thereof.

Since the match solenoid 324 obtains power through the correct change price switch 434, it can be seen that energization of the correct change solenoid 414 along with solenoid 324, effects shifting of switch arm 618 into engagement with contact 1000, whereby the circuit to solenoid 324 is broken very shortly after energization thereof, and therefore the retainer element 328 is returned to disposition where the same can again be engaged by the lock extension 292c of cam and latch member 292, when the same is rotated by the component 300 as previously described.

The circuitry shown in FIGS. 27–A and 27–B requires that a package of cigarettes be vended from the machine before a customer can obtain a booklet of matches and recocking of the match dispenser is required in order to effect discharge of another booklet of matches from the machine.

The automatic match dispenser may be deactivated by simply moving the component 300 into a location where the latter is not engaged by the lug 306 during reciprocation of the plates 160. Structure not shown is normally provided for permitting selective retention of the component 300 in the inactive position thereof.

*Vend cycle at correct change*

The vending of a package of cigarettes from apparatus 30 at a price equal to the amount of money deposited in coin handling and changing unit 532 is substantially identical with that previously described with the exception that the movable contacts 772 of stepper assembly 664 are not shifted as far with respect to the fixed contact 774 as in the operation previously described. For example, upon deposit of 15¢ in unit 532, such as a nickel and a dime, the switch arm 584 of switch 586 will be moved into engagement with contact 660 to effect energization of step-up solenoid 662 for one step, while shifting of both of the switch arms 584 and 592 of switches 586 and 594 by a dime will result in two additional pulses being sent to the coil of solenoid 662, whereby the contact 772e is shifted into engagement with fixed contact 774e with the correct change line 828 thereby bridging line 830 and the 15¢ contact 774c.

When the customer depresses the button 50 corresponding to push rod 350", the connector element 356" will be shifted inwardly to move the pricing member 458 to the right through a path to operate switch 472 as set forth. Upon engagement of the switch arm 778 with contact 808, the vend motor 896 will commence operation to eject a package of cigarettes from the column corresponding to the push button aligned with rod 350".

If the customer should push a selector button 50 corresponding to a product at a price higher than 15¢, members 458 and 460 will operate the other pricing switches 474, 488 or 490, thereby maintaining the vend motor 896 in a deenergized condition because of the fact that the movable contact 772e of stepper assembly 664 is not in engagement with a contact 774 corresponding to the position of correct price connector line 828 joined to movable contact 772e. The coin accept solenoid 916 will be energized upon deactivation of the cancel bar relay 826 and return of lock bar switch 388 to its normal position so that the customer cannot obtain return of his money.

*Vend cycle when selected product sold out*

If the cigarette package storage column of apparatus 30 corresponding to push rod 350" is exhausted of packages after the customer has made a deposit of sufficient money in unit 532 to normally permit vending of an article at a correct price deposit, or in conjunction with return of change coins to the customer, the mechanisms 144 and 146 will go through a vend cycle without ejection of an article, and the customer is then permitted to actuate another push button to vend an article without the customer being required to redeposit his money, since the change is retained in the escrow section 532a of unit 532 until the customer does obtain a product, or in the alternative, actuates the coin return push button 54 on panel 44.

Initially assuming a deposit of 25¢ in the machine whereby the movable contacts 772a to 772e inclusive are stepped five increments relative to the fixed contacts 774a to 774h inclusive, upon actuation by the customer of a push rod such as 350", the switch 472 will be operated to effect operation of the vend motor 896. The pusher finger 172 corresponding to the actuated push rod 350" will be shifted into article ejecting position, but during forward movement of the mechanism 146, the cross head 180 on the selected pusher finger 172 fails to contact a package of cigarettes and thereby resulting in the cancel bar switch 269 remaining in engagement with contact 874 to maintain the cancel bar relay 826 in an energized condition as illustrated in FIG. 27-A. During return movement of the plates 160 and 162 toward the initial disposition thereof, the upper flange of plate 160 engages the operating arm 224 of switch 222 to move switch arm 894 into engagement with contact 942. By virtue of the energized condition of relay 826, the sold-out relay 760 will be energized from line 792 through switch arm 776 of pricing switch 474, contact 784, line 796, switch arm 778 of pricing switch 472, contact 808, line 810, contact 774c, contact 772c, line 820, line 822, relay switch arm 824, contact 846, line 844, relay switch arm 842, contact 838, line 960, sold-out switch arm 894, contact 942, line 944, contact 946, contact 961, sold-out relay switch arm 962, line 968, coil 966, line 978 and power lead line 562. The sold-out lamp 972 is energized simultaneously therewith through line 970 between lines 968 and lead line 562. The relay switch arms 762 and 962 are shifted into engagement with contacts 946 and 974 respectively upon energization of the coil 966 of sold-out relay 760 thereby energizing the unlatch solenoid 408 through switch arm 762 to release the connector element 356" and push rod 350" for return to the original locations of the same. A holding circuit for relay 760 is established through the switch arm 962 by a circuit including power lead line 560, line 768, contact 740, switch arm 738 of switch 734, line 742, line 976, contact 974, relay switch arm 962, line 968, coil 966, line 978 and lead line 562. The lamp 972 is maintained in an energized condition through the same circuit. The sold-out relay 760 remains energized until the customer makes another selection or obtains return of his money.

Upon discontinuance of operation of the vend motor 896 without delivery of a package of cigarettes to the customer and upon energization of the sold-out relay 760 in conjunction with lighting of the sold-out lamp 972, the customer has the option of selecting another item either at the price of the total value of money deposited in coin accepting and changing unit 532, or at some lower value with the necessary change being returned during operation of the apparatus. If the item selected is at a higher price than the money totalized by stepper assembly 664, the customer may deposit additional coins in slot 48 and the value thereof will be accumulated by stepper assembly 664 whereupon the higher priced selection may be made.

If, on the other hand, the customer desires to obtain return of his money without purchase of a product, this may be accomplished by depression of the coin return push button 54 which operates switch 630 mounted within unit 532. Manual inward movement of the coin return push button 54 shifts link 540 rearwardly of tray 344 to pivot the lever arm 536 about the axis of mounting thereof on bracket 538 whereby the scavenge lever of the coin accepting and rejecting mechanism of unit 532 is depressed to operate the control lever arm of switch 630 positioned to be engaged by the scavenge lever during swinging movement thereof.

When the switch arm 628 is moved into engagement with contact 636, the pulse timer motor 692 is energized through a path from terminal 556 including power lead line 560, switch arm 564 of switch 566, contact 570, line 576, line 580, relay switch arm 578 of credit hold relay 574, relay contact 582, line 588, switch arm 584 of switch 586, contact 590, line 596, switch arm 592 of switch 594, contact 598, line 604, switch arm 600 of switch 602, contact 606, line 610, switch arm 608 of switch 616, contact 614, line 612, switch arm 618 of correct price switch 434, contact 620, line 622, switch arm 624 of switch 386, contact 626, line 627, switch arm 628 of coin return switch 630, contact 636, line 638, switch arm 640 of zero credit switch 642, contact 678, line 682, contact 680 of credit hold relay 574, relay switch arm 684, line 686, contact 688, switch arm 694 of motor carry-over switch 690, line 696, the field windings of pulse timer motor 692, line 696 and power lead line 562. Energization of the pulse timer motor effects return of the movable contacts 772 of stepper assembly 664 to the normal positions thereof as previously described with the full-step switch 1002 providing the final pulse to the credit step-back solenoid 720.

When the rotor 1040 reaches the normal stand-by position thereof, the switch arm 640 of zero credit switch 642 returns to its position in engagement with contact 644 thereby completing a circuit to coin return solenoid 654 from line 638 through switch arm 640, contact 644, line 648, switch arm 646 of lock bar switch 390, contact 650, line 652, the coil of solenoid 654, line 656 and power lead line 562. The coins held in escrow in the section 532a of unit 532 are thereby released for gravitation via chute 550 to the lower portion of housing 32 adjacent the opening 60 in front panel 44.

It is to be remembered that the coin accepting and changing unit 532 has change coin supply tubes therein for permitting return of change to the customer if necessary, and since these coin tubes are replenished with change coin denomination coins deposited in apparatus 30, the unit 532 includes double escrow structure for maintaining nickels in escrow above the coin tubes, and the remaining coins in escrow in the section 532a so that if the customer desires to obtain return of his coins, this may be accomplished even if certain of the coins are held in escrow above the coin change tubes. Therefore, although only one coin return solenoid 654 has been shown in the schematic circuitry shown in FIGS. 27-A and 27-B, it is to be understood that if a changer unit 532 is employed having coin storage tubes replenished by coins deposited in the machine by a customer, the escrow solenoids controlling return of coins to the customer are in parallel relationship so that both of the same are actuated simultaneously. By the same token, the coin accept solenoid 916 is mechanically connected to structure controlling gravitation of nickels into the upper ends of the coin stroage tubes upon completion of the vend cycle wherein a product is delivered to the customer.

At the completion of operation of the pulse timer motor to return the cams 1018 and 1020 to normal as shown in FIG. 22, the holding switch 734 will have opened to break the circuit to sold-out relay 760 that was established through line 560, line 768, contact 740, switch arm 738, line 742, line 976, contact 974, relay switch arm 962, line 968, coil 966, line 978 and power lead line 562. The sold-out lamp 972 will be deenergized along with the sold-out relay 760.

The description thus far has been premised on rotation of the cams 1018 and 1020 through substantially 180° during each operation of apparatus 30, and this is predicated on the United States currency system wherein nickels, dimes and quarters are in the relative value ratio of 1 to 2 to 5, but it is to be understood that where apparatus 30 is set up to operate with other currency values, the cams 1018 and 1020 can be rotated for a full revolution for example in association with suitable relays to provide for different relative values of the monetary system of coins that may be introduced into unit 532. For example, by rotating the cams 1018 and 1020 through a full revolution, relative ratios of the coins can be established of 1 to 5 to 10 wherein the initial pulse for step-up solenoid 662 is furnished by switch 586, the next four pulses by the energization of motor 692 through credit hold relay 574 as set forth, and the final five pulses afforded by a subsequent reenergization of the relay 574 through another switch actuated by the coin and in association with a relay so that the notches 1020a in the other 180° segment of cam 1020 pulse step-up solenoid 662. The movable contacts 772 of stepper assembly 664 can be returned to the normal condition thereof in the same manner by rotation of the cams 1018 and 1020 through a full 360°.

Having thus described the invention, what is claimed as new and desired to be secured by Letters Patent is:

1. Vending apparatus comprising:

a plurality of structures each adapted to receive an upright stack of articles to be vended and each including support means engageable with the lowermost article in respective stacks in supporting relationship to the latter;

article ejecting means for each of said structures and each shiftable along alternative paths of travel relative to said structures, each of the article ejecting means being initially movable along a first path of travel below the lowermost article of the stack aligned therewith and thence selectively along an alternate second path of travel to engage the lowermost article of said aligned stack and eject said lowermost article therefrom, the article ejecting means each engaging and being supported by the supporting means of the structure aligned therewith during movement of the article ejecting means along a substantial portion of the second path of travel thereof;

selectively operable means associated with each of said article ejecting means for camming a selected one of the latter to a position for movement along said second path of travel of the same, as the article ejecting means move along a portion of said first path of travel thereof, said selectively operable means including means preventing operation of more than one selectively operable means at a time;

shiftable means operably coupled to said article ejecting means for shifting the latter simultaneously; and control means adapted to be actuated by monetary means deposited therein and operably coupled to said shiftable means for permitting actuation of the latter only after deposit of proper monetary means in said control means.

2. Vending apparatus comprising:

a plurality of structures each adapted to receive an upright stack of articles to be vended and each including support means below the lowermost article in respective stacks in supporting relationship to the latter;

article ejecting means for each of said structures and each shiftable along alternative paths of travel relative to said structures, each of the article ejecting means being movable along a first path of travel below the lowermost article of the stack aligned therewith and along an alternate second path of travel to engage the lowermost article of said aligned stack and eject said lowermost article therefrom, the article ejecting means each engaging and being supported by the supporting means of the structure aligned therewith during movement of the article ejecting means along a substantial portion of the second path of travel thereof, all of the article ejecting means normally being located intermediate the ends of the paths of travel of the same;

shiftable means operably coupled to said article ejecting means for shifting the latter from said normal location thereof to one end of the paths of travel of the same, thence to the opposite end of the paths of travel and finally returning the article ejecting means to said normal location thereof;

selectively operable means associated with each of said article ejecting means for shifting the latter to a position for movement along said second path of travel of the same as the article ejecting means is shifted to said one end of the paths of travel thereof, said selectively operable means including means preventing operation of more than one selectively operable means at a time; and control means adapted to be actuated by monetary means deposited therein and operably coupled to said shiftable means for permitting actuation of the latter only after deposit of proper monetary means in said control means.

3. Vending apparatus as set forth in claim 2 wherein said selectively operable means includes cam means aligned with each of said structures and selectively shiftable into the path of travel of a respective article ejecting means before movement thereof to said one end of the paths of travel of the same for camming the respective article ejecting means into the position thereof for movement along the second path of travel.

4. Vending apparatus as set forth in claim 3 wherein said support means of each of the structures includes horizontally spaced members defining an elongated slot therebetween longitudinally aligned with the paths of travel of said article ejecting means, each of said article ejecting means including a generally T-shaped ejector element having an article ejecting crosshead engageable with said members of an article receiving structure aligned therewith, an upright leg section depending from the crosshead and slidable through a corresponding aligned slot, and a lower leg segment connected to the leg section and extending away from the selectively operable means aligned with the same to define a downwardly facing cam surface, the leg segments of the ejector elements being pivotally mounted on said shiftable means for swinging movement of the crossheads from normal disposition below said members of the structure to a location for shifting movement and in engagement with the members, said cam means of the selectively operable means having an inclined cam face and selectively movable into a position to engage a respective cam surface of said ejector elements and effect swinging thereof during shifting of the same toward the cam means through an arc to shift the crosshead of the selected element to said location thereof.

5. Vending apparatus as set forth in claim 4 wherein each of said selectively operable means includes an upright, vertically shiftable rod component adjacent each article-receiving structure and terminating at the lower extremity thereof adjacent an ejector element aligned therewith, the cam means of each selectively operable means being connected to said lower extremity of each of the rod components and extending toward said article ejector of a respective article ejecting means, said leg members clearing said article ejector when the rod components are in the normal upper locations of the same and positioned in the path of travel of an article ejector aligned therewith when the rod components are shifted to the actuated lower position of their paths of travel to engage the cam surface of a respective article ejector and swing the latter into disposition with the crosshead thereof above the members of a corresponding article receiving structure.

6. Vending apparatus as set forth in claim 5 wherein said cam means are of formed flat spring material configured to be clipped on said rod components.

7. Vending apparatus as set forth in claim 5 wherein is provided manually actuatable linkage means extending across the upper extremities of said article receiving structures and operably joined to the upper ends of said rod components for shifting the latter to the lower positions of the same in response to manual actuation of a respective linkage means.

8. Vending apparatus as set forth in claim 7 wherein is provided means operably associated with said linkage means for maintaining each of the latter in the actuated condition thereof until the shiftable means coupled to said article ejectors has completed a cycle of movement thereof.

9. Vending apparatus as set forth in claim 8 wherein said means operable to maintain each of the linkage means in the actuated condition thereof includes means blocking actuation of any other linkage means until the actuated linkage means has returned to the normal condition of the same.

10. Selector switch mechanism for vending apparatus comprising:
a plurality of customer operated elements shiftable along generally parallel paths of travel and each movable from a normal first position to an operated location;
means associated with said elements and actuated thereby for preventing more than one element being moved to said location thereof at a time;
a pair of spaced, elongated members adjacent said elements and movable along parallel paths transversely of the path of travel of the elements;
a pair of switch units operably associated with each of said members at the same ends of the latter with one of the units of each pair being actuated by a respective member upon shifting of the latter in one direction and the other unit of each pair being actuated by a corresponding member upon shifting of the latter in the opposite direction; and
a cam lug mounted on each of the elements and extending therefrom in a direction to engage a corresponding one of the members, each of said cam lugs being positionable on a respective element in one of four positions, said members having cam surfaces thereon for each of the cam lugs and disposed to be engaged by the latter as a respective element is moved to said location thereof, each of the cam lugs engaging a respective cam surface on one of the members to shift the latter in one direction when a corresponding cam lug is in one position thereon, to shift said one member in the opposite direction when the cam lug is in the second position thereof, to shift the other member in one direction when the cam lug is in a third position and to shift said other member in the opposite direction when the cam lug is in a forth position.

11. Selector switch mechanism as set forth in claim 10 wherein said member is provided with a pair of opposed cam surfaces thereon for each cam lug and disposed at converging, inclined angles relative to the longitudinal axis of the member defining V-shaped notches therebetween, each of said cam lugs being aligned with one of the cam surfaces defining a respective slot when the elements are in said normal position thereof.

12. Selector switch mechanism as set forth in claim 11 wherein each pair of switch units are positioned adjacent one extremity of a respective member and on one side of the longitudinal axis thereof, each of said switch units having an actuating component thereon and the latter being located in outwardly facing, opposed relative directions parallel with said axis of corresponding members, operating levers for said units mounted for rotation about a common axis between adjacent units, one end of each lever normally engaging a respective component of the units and the opposite ends of the levers overlying said one extremity of a corresponding member, and a boss on each member positioned between said opposite ends of adjacent levers for effecting swinging movement of one of the latter to actuate the switch component associated therewith when the respective member is shifted in one direction and for swinging the other lever to actuate the switch component associated with the same when said member is shifted in the opposite direction.

13. Selector switch mechanism as set forth in claim 10 wherein said cam lugs are selectively removable from said elements to render the cam lugs ineffective to shift respective members.

14. Selector switch mechanism as set forth in claim 10 wherein said cam lugs are selectively positionable in a fifth position on each element rendering the cam lugs ineffective to shift either of said members.

References Cited in the file of this patent

UNITED STATES PATENTS

| | | |
|---|---|---|
| 2,333,176 | Hoban | Nov. 2, 1943 |
| 2,649,947 | Nelsen | Aug. 25, 1953 |
| 2,661,827 | Munz et al. | Dec. 8, 1953 |
| 2,973,075 | Du Grenier et al. | Feb. 28, 1961 |
| 2,974,772 | Zeigle et al. | Mar. 14, 1961 |
| 3,000,539 | Danziger et al. | Sept. 19, 1961 |
| 3,019,941 | Gabrielsen et al. | Feb. 6, 1962 |
| 3,074,593 | Krakauer et al. | Jan. 22, 1963 |